(12) United States Patent
Oyamada et al.

(10) Patent No.: US 11,874,873 B2
(45) Date of Patent: *Jan. 16, 2024

(54) KNOWLEDGE EXPANSION SYSTEM, METHOD, AND PROGRAM

(71) Applicant: NEC CORPORATION, Tokyo (JP)

(72) Inventors: Masafumi Oyamada, Tokyo (JP); Ryo Hanafusa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 800 days.

This patent is subject to a terminal disclaimer.

(21) Appl. No.: 16/977,917

(22) PCT Filed: Mar. 7, 2018

(86) PCT No.: PCT/JP2018/008759
§ 371 (c)(1),
(2) Date: Sep. 3, 2020

(87) PCT Pub. No.: WO2019/171490
PCT Pub. Date: Sep. 12, 2019

(65) Prior Publication Data
US 2020/0410168 A1    Dec. 31, 2020

(51) Int. Cl.
*G06F 16/901* (2019.01)
*G06F 16/93* (2019.01)
*G06F 40/284* (2020.01)

(52) U.S. Cl.
CPC .......... *G06F 16/9024* (2019.01); *G06F 16/93* (2019.01); *G06F 40/284* (2020.01)

(58) Field of Classification Search
CPC ..... G06F 16/9024; G06F 16/93; G06F 40/284
See application file for complete search history.

(56) References Cited

FOREIGN PATENT DOCUMENTS

| JP | 2007-094775 A | 4/2007 |
| JP | 2009-140056 A | 6/2009 |
| WO | 20081093569 A1 | 8/2008 |

OTHER PUBLICATIONS

Combi et al., Querying XML documents by using association rules, 2005, IEEE, whole document (Year: 2005).*
Patrick Pantel et al., "Espresso: Leveraging Generic Patterns for Automatically Harvesting Semantic Relation", Proceedings of the 21st International Conference on Computational Linguistics and 44th Annual Meeting of the ACL, Jul. 2006, pp. 113-120.
Michihiro Kuramochi et al., "Frequent Subgraph Discovery", IEEE, 2001, pp. 313-320.

(Continued)

*Primary Examiner* — Sonia L Gay
(74) *Attorney, Agent, or Firm* — Sughrue Mion, PLLC

(57) ABSTRACT

A subgraph extraction means 71 extracts, from a document structure graph indicating a document structure, a subgraph as a part of the document structure graph on the basis of inter-word relationship information indicating a relationship between a word and a word. A rule creation means 72 creates a rule for extracting a subgraph having the same structure as the subgraph from the document structure graph. A knowledge addition means 73 extracts a subgraph from the document structure graph in accordance with the rule and adds the information indicated by the subgraph to the inter-word relationship information.

6 Claims, 25 Drawing Sheets

(56) References Cited

OTHER PUBLICATIONS

Akio Kobayashi, "A Method for Automatic Ontology Construction Using Wikipedia", The IEICE Transactions On Information and Systems (Japanese Edition), Dec. 1, 2010, pp. 2597-2609, vol. J93-D, No. 12.
International Search Report for PCT/JP2018/008759, dated May 29, 2018.
Japanese Office Action for JP Appiication No. 2020-504549 dated Nov. 24, 2021 with English Translation.

* cited by examiner

FIG. 3
The members of this project are as follows.
• Researcher
  • Oyamada
  • Hanafusa
  • Takeoka
• Engineer
  • Fukata
  • Koiwa
FIG. 4
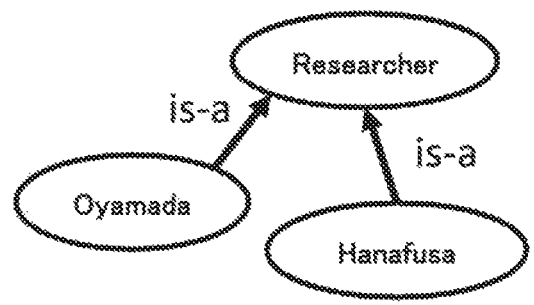
FIG. 5
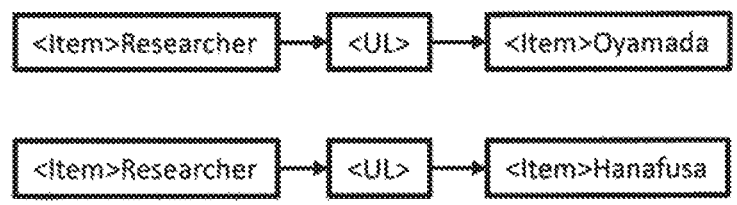

FIG. 8
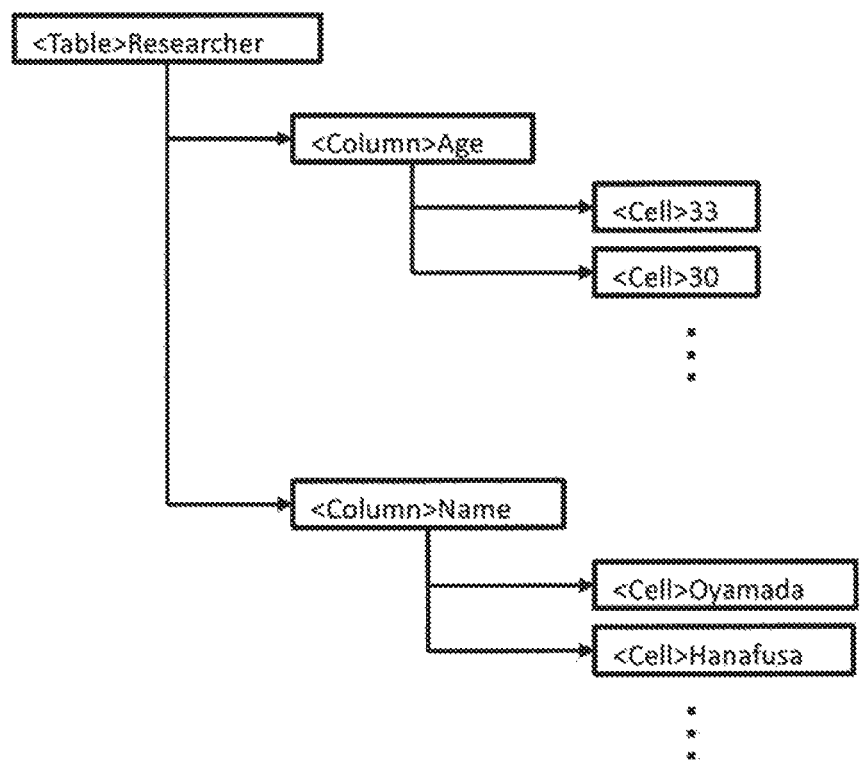
FIG. 9
| Reseacher ||
|---|---|
| Age | Name |
| 33 | Oyamada |
| 30 | Hanafusa |
| : | : |
FIG. 10
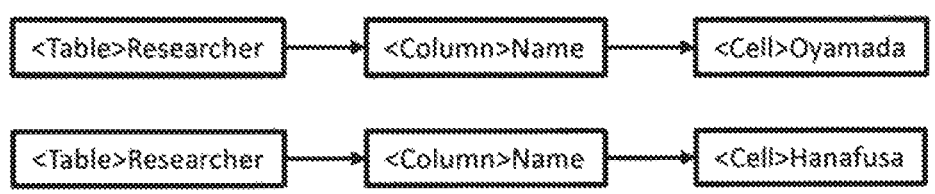

Oyamada is a researcher.
Hanafusa is a researcher.
Takeoka is a researcher.
Fukata is an engineer.

Oyamada is a researcher.
Hanafusa is a researcher.

Takeoka is a researcher.
Fukata is an engineer.

FIG. 40

```
The members are as follows.
 *Researcher
   *Oyamada
   *Hanafusa
   *Takeoka
 *Engineer
   *Fukata
   *Koiwa
```

FIG. 41

```
The members are as follows.
Researcher. Oyamada. Hanafusa.
Takeoka. Engineer. Fukata. Koiwa.
```

KNOWLEDGE EXPANSION SYSTEM, METHOD, AND PROGRAM

CROSS REFERENCE TO RELATED APPLICATIONS

This application is a National Stage of International Application No. PCT/JP2018/008759 filed Mar. 7, 2018.

BACKGROUND ART

Inter-word relationship information is information indicating relationships between words as knowledge, with words being regarded as nodes. For example, the inter-word relationship information refers to a knowledge base or a conceptual dictionary. FIG. 34 is a schematic diagram illustrating an example of the inter-word relationship information. As shown in FIG. 34, the inter-word relationship information is represented as a graph. The nodes included in the inter-word relationship information illustrated in FIG. 34 represent words. The words having a relationship are connected to each other by a link, and the type of the relationship is assigned to the link. In the example shown in FIG. 34, the type "is-a" has been assigned to all the links. That is, each link indicates that the two words connected by the link has the is-a relationship. The relationship between words indicated by a link is not limited to the is-a relationship. For example, the inter-word relationship information may include knowledge indicating that words have a "synonym" relationship. The is-a relationship represents the hierarchy of elements (in the present example, words), and in the link, an arrowhead is added to the upper level side and no arrowhead is added to the lower level side. It should be noted that "Oyamada", "Hanafusa", "Takeoka", and "Fukata" illustrated in FIG. 34 are persons names.

Non Patent Literature (NPL) 1 describes a technique of extracting a semantic relationship.

Patent Literature (PTL) 1 describes a device that extracts the is-a relationship in accordance with a hierarchical relationship of document headings.

NPL 2 describes a technique of finding frequent subgraphs from a large graph database.

CITATION LIST

Patent Literature

PTL 1: Japanese Patent Application Laid-Open No. 2009-140056

Non Patent Literatures

NPL 1: Patrick Pantel, Marco Pennacchiotti, "Espresso: Leveraging Generic Patterns for Automatically Harvesting Semantic Relation", Proceedings of the 21st International Conference on Computational Linguistics and 44th Annual Meeting of the ACL, pages 113-120, July 2006.

NPL 2: Michihiro Kuramochi, George Karypis, "Frequent Subgraph Discovery", IEEE, 2001

SUMMARY OF INVENTION

Technical Problem

The inter-word relationship information does not necessarily include the knowledge desired by a person who is intended to utilize the inter-word relationship information. It is therefore preferable to expand the knowledge indicated by the inter-word relationship information, by adding new nodes and links to the inter-word relationship information.

The inventors of the present invention assumed, as a way of expanding the knowledge indicated by the inter-word relationship information, a general technique as follows.

In this general technique, a written document and inter-word relationship information are given. The knowledge indicated by the given inter-word relationship information is referred to as "known knowledge". Here, a description will be made by using as an example the case where the document shown in FIG. 35 is given. The description will also be made assuming that the inter-word relationship information shown in FIG. 36 is given.

In this general technique, firstly, any sentence that includes the known knowledge is extracted from the given document. In the present example, the first and second sentences are extracted from the document shown in FIG. 35. That is, the two sentences shown in FIG. 37 are extracted.

Further, a common character pattern is extracted from each of the extracted sentences. At this time, in the character pattern, the words indicated by the known knowledge are replaced with signs. Here, it is configured such that when the word included in the extracted sentence (the word indicated by the known knowledge) is of a lower level, the word is replaced with the sign "XXX". Similarly, it is configured such that when the word included in the extracted sentence (the word indicated by the known knowledge) is of an upper level, the word is replaced with the sign "YYY".

In the present example, from each of the sentences shown in FIG. 37, a character pattern "XXX is a YYY." is extracted as the common character pattern. This character pattern is a rule for extracting new knowledge from the given document (see FIG. 35).

Next, the above rule is applied to the given document (see FIG. 35) to extract any sentence representing new knowledge. That is, the sentences that match the above rule are extracted from the given document. At this time, the sentences including the known knowledge do not need to be extracted. In the present example, two sentences shown in FIG. 38 are extracted in accordance with the rule. It should be noted that in the present example, "a" and "an" are regarded as the same character.

Next, the knowledge indicated by the sentences extracted on the basis of the rule is added to the inter-word relationship information. This results in the inter-word relationship information shown in FIG. 39. In FIG. 39, the added nodes and links are shown with dashed lines. As a result, the knowledge indicated by the inter-word relationship information is expanded.

However, a document can have a document structure of, for example, bulleted list, headings, tables, etc. In the general technique described above, sentences containing known knowledge are extracted from a written document. Therefore, it is not possible to properly extract sentences containing known knowledge from a document that has a document structure but is not written in sentences. For example, suppose that the bulleted document illustrated in FIG. 40 has been given. In FIG. 40, there is no sentence except for the second line. When one word is considered to be one sentence in the second line and on in FIG. 40, the document shown in FIG. 40 is represented as in FIG. 41. However, even if one word is regarded as one sentence, a sentence containing the known knowledge cannot be extracted. Therefore, the knowledge indicated by the inter-word relationship information cannot be expanded when a document having the document structure like the bulleted list is given.

Essentially, a document having a document structure represents a relationship between the upper and lower levels in hierarchy, for example, so it is preferable to utilize the document to obtain new knowledge. However, the general technique described above is unable to expand the inter-word relationship information on the basis of a document having a document structure.

It is therefore an object of the present invention to provide a knowledge expansion system, a knowledge expansion method, and a knowledge expansion program capable of expanding knowledge included in inter-word relationship information on the basis of a document structure graph, indicating the document structure, and the inter-word relationship information.

Solution to Problem

A knowledge expansion system according to the present invention includes: subgraph extraction means for extracting from a document structure graph indicating a document structure a subgraph as a part of the document structure graph on the basis of inter-word relationship information indicating a relationship between a word and a word; rule creation means for creating a rule for extracting a subgraph having a same structure as the subgraph from the document structure graph; and knowledge addition means for extracting a subgraph from the document structure graph in accordance with the rule and adding information indicated by the subgraph to the inter-word relationship information.

Further, a knowledge expansion method according to the present invention includes: extracting from a document structure graph indicating a document structure a subgraph as a part of the document structure graph on the basis of inter-word relationship information indicating a relationship between a word and a word; creating a rule for extracting a subgraph having a same structure as the subgraph from the document structure graph; and extracting a subgraph from the document structure graph in accordance with the rule and adding information indicated by the subgraph to the inter-word relationship information.

Further, a knowledge expansion program according to the present invention causes a computer to perform: subgraph extraction processing of extracting from a document structure graph indicating a document structure a subgraph as a part of the document structure graph on the basis of inter-word relationship information indicating a relationship between a word and a word; rule creation processing of creating a rule for extracting a subgraph having a same structure as the subgraph from the document structure graph; and knowledge addition processing of extracting a subgraph from the document structure graph in accordance with the rule and adding information indicated by the subgraph to the inter-word relationship information.

Advantageous Effects of Invention

The present invention enables expansion of knowledge included in inter-word relationship information, on the basis of the document structure graph indicating the document structure and the inter-word relationship information.

BRIEF DESCRIPTION OF DRAWINGS

FIG. 3 is a schematic diagram showing a document corresponding to the document structure graph shown in FIG. 2.

FIG. 4 is a schematic diagram showing an example of inter-word relationship information.

FIG. 5 is a schematic diagram showing examples of subgraphs extracted from the document structure graph.

FIG. 8 is a schematic diagram showing an example of a graph included in a document structure graph.

FIG. 9 is a schematic diagram showing a table in a document, corresponding to the graph shown in FIG. 8.

FIG. 10 is a schematic diagram showing examples of subgraphs extracted from the graph shown in FIG. 8.

FIG. 40 is a schematic diagram showing an example of a bulleted document.

FIG. 41 is a schematic diagram showing an example of the case where one word in the bulleted list is regarded as one sentence.

DESCRIPTION OF EMBODIMENT

Embodiments of the present invention will be described below with reference to the drawings.

Embodiment 1

Figure 1:
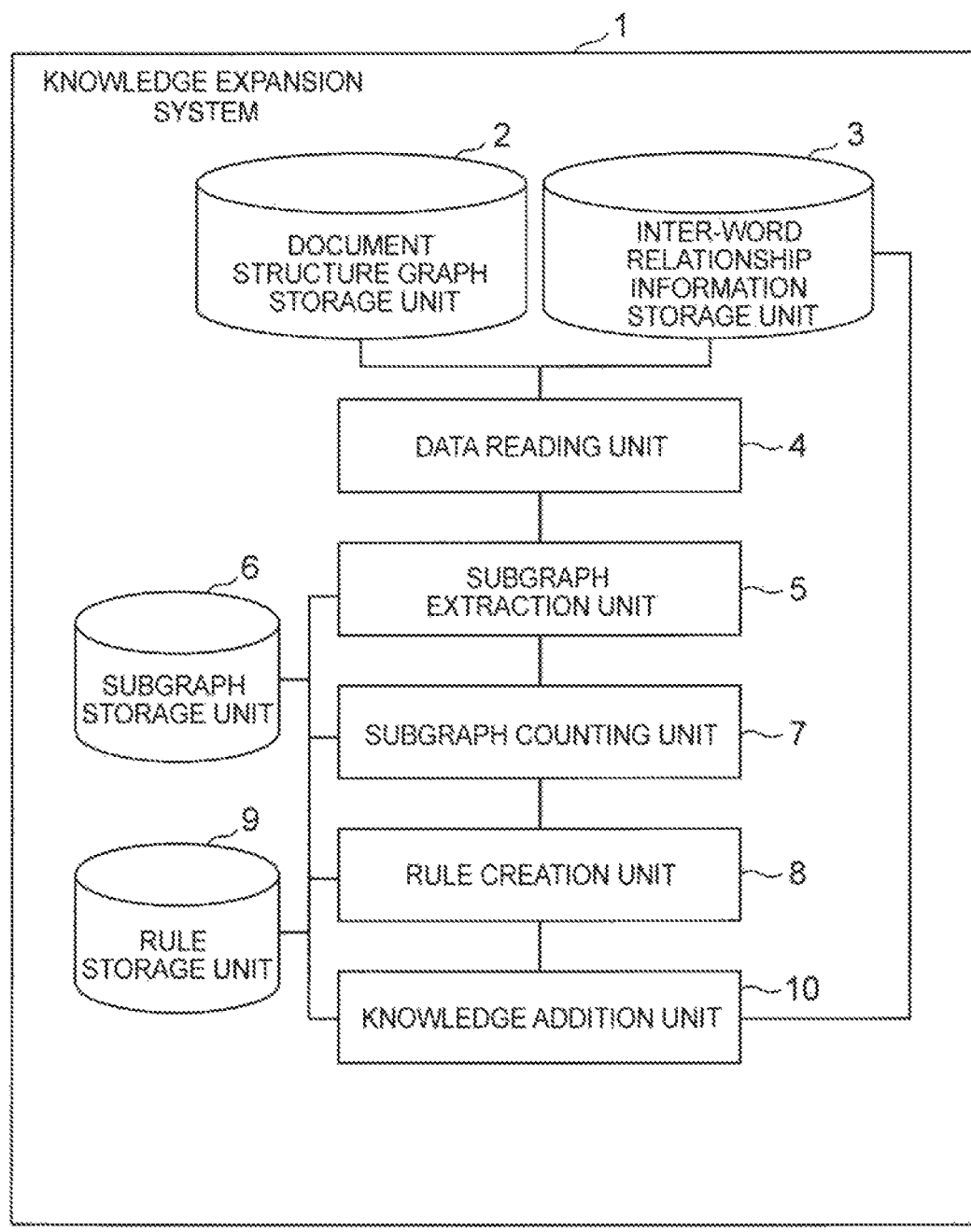
FIG. 1 is a block diagram showing an exemplary configuration of a knowledge expansion system of a first embodiment of the present invention.

FIG. 1 is a block diagram showing an exemplary configuration of the knowledge expansion system of a first embodiment of the present invention. The knowledge expansion system 1 of the first embodiment includes a document structure graph storage unit 2, an inter-word relationship information storage unit 3, a data reading unit 4, a subgraph extraction unit 5, a subgraph storage unit 6, a subgraph counting unit 7, a rule creation unit 8, a rule storage unit 9, and a knowledge addition unit 10.

Figure 2:
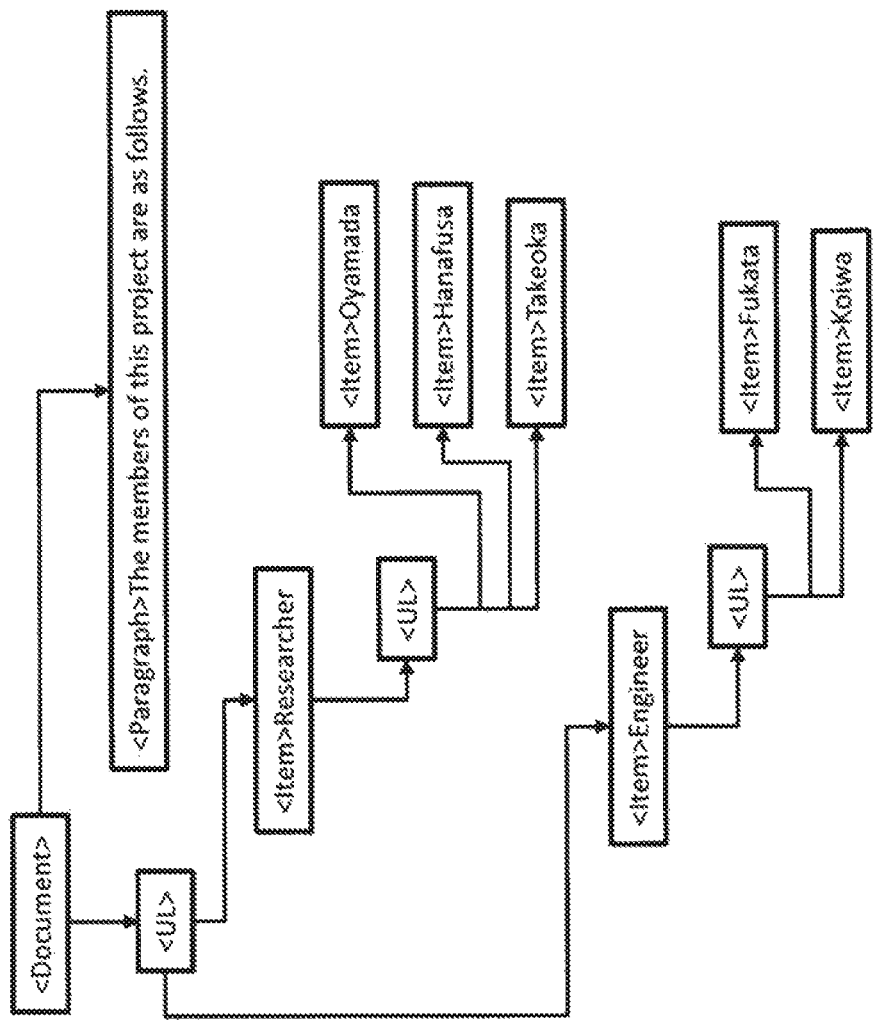
FIG. 2 is a schematic diagram showing an example of a document structure graph.

The document structure graph storage unit 2 is a storage device that stores a document structure graph. The document structure graph is a graph indicating a document structure. FIG. 2 is a schematic diagram showing an example of the document structure graph. A document represented as the document structure graph illustrated in FIG. 2 is viewed as a document illustrated in FIG. 3 when viewed by humans as an ordinary document. That is, the document structure graph shown in FIG. 2 indicates the document structure of the document shown in FIG. 3.

The document structure graph includes a plurality of nodes. Each rectangle shown in FIG. 2 corresponds to a node. Each individual node includes at least node type information indicating the type of the node. In each embodiment, the node type information will be described as being represented by a tag. In FIG. 2, "<Document>" means a document. "<Paragraph>" means a paragraph. "<UL>" means an unordered list. "<Item>" means a word or phrase. It should be noted that the node type information is not limited to each tag shown in FIG. 2. Tags suited to the document structure may be used at nodes in the document structure graph.

Individual nodes may include text in addition to the node type information. In the example shown in FIG. 2, the nodes having the <Item> tag as the node type information and the node having the <Paragraph> tag as the node type information contain text.

Further, related nodes are connected by a link (see FIG. 2).

The document structure graph is stored in advance in the document structure graph storage unit 2 by the administrator of the knowledge expansion system 1 (hereinafter, simply referred to as the administrator).

A graph corresponding to a part of the document structure graph will be referred to as a subgraph.

The inter-word relationship information storage unit 3 is a storage device that stores inter-word relationship information. As previously explained, the inter-word relationship information is information represented as a graph, with words as nodes, indicating the relationship between words as knowledge. The nodes included in the inter-word relationship information represent words. The words having a relationship are connected to each other by a link, and the link has the type of the relationship assigned thereto. In addition, in the link, an arrowhead is added to the upper level side, and no arrowhead is added to the lower level side. The inter-word relationship information storage unit 3 has the inter-word relationship information stored in advance by the administrator. The inter-word relationship information stored in the inter-word relationship information storage unit 3 may be the inter-word relationship information available to the public, or it may be the inter-word relationship information created by the administrator.

Here, to simplify the explanation, the case where the inter-word relationship information illustrated in FIG. 4 is stored in the inter-word relationship information storage unit 3 will be described by way of example.

The data reading unit 4 reads a document structure graph from the document structure graph storage unit 2 and inter-word relationship information from the inter-word relationship information storage unit 3.

The subgraph extraction unit 5 extracts respective sets of two words having a relationship from the inter-word relationship information. For example, the subgraph extraction unit 5 extracts, from the inter-word relationship information shown in FIG. 4, a set of two words "Oyamada" and "Researcher" having the is-a relationship and a set of two words "Hanafusa" and "Researcher" having the is-a relationship.

The subgraph extraction unit 5 further extracts, from the document structure graph, a minimum subgraph that has a node containing one of two words having a relationship in its text and a node containing the other of the two words in its text at both ends.

For example, when focusing on the set of the two words "Oyamada" and "Researcher" having the is-a relationship, the subgraph extraction unit 5 extracts, from the document structure graph, a minimum subgraph that has at both ends a node containing "Oyamada" in its text and a node containing "Researcher" in its text. Similarly, when focusing on the set of the two words "Hanafusa" and "Researcher" having the is-a relationship, the subgraph extraction unit 5 extracts, from the document structure graph, a minimum subgraph that has at both ends a node containing "Hanafusa"

in its text and a node containing "Researcher" in its text. FIG. 5 is a schematic diagram showing the subgraphs thus obtained.

The structure of the subgraphs extracted by the subgraph extraction unit 5 is not limited to the one illustrated in FIG. 5.

Figure 6:
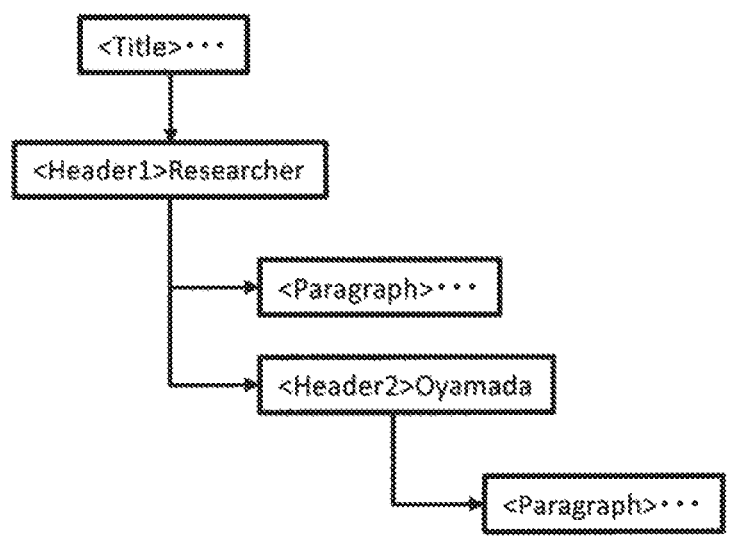
FIG. 6 is a schematic diagram showing an example of a graph included in a document structure graph.

For example, suppose that the document structure graph includes a graph shown in FIG. 6. It is noted that "<Header1>" in FIG. 6 means a headline, and "<Header2>" means a subheading. "Title" means a title. In FIG. 6, " . . . " indicates that the specific text is omitted from the illustration. When the document structure graph includes the graph shown in FIG. 6, the subgraph extraction unit 5 further extracts a subgraph illustrated in FIG. 7 as a minimum subgraph that has at both ends a node containing "Oyamada" in its text and a node containing "Researcher" in its text.

Also suppose, for example, that the document structure graph includes a graph shown in FIG. 8. The graph shown in FIG. 8 corresponds to a table shown in FIG. 9. That the document structure graph includes the graph shown in FIG. 8 means that the document includes the table shown in FIG. 9. Further, in FIG. 8, "<Table>" means the name of the table, and "<Column>" means the name of the column in the table. "<Cell>" means a cell in the table. In this case, the subgraph extraction unit 5 also extracts, from the graph shown in FIG. 8, a minimum subgraph that has at both ends a node containing "Oyamada" in its text and a node containing "Researcher" in its text. The subgraph extraction unit 5 also extracts, from the graph shown in FIG. 8, a minimum subgraph that has at both ends a node containing "Hanafusa" in its text and a node containing "Researcher" in its text. As a result, the subgraphs shown in FIG. 10 are obtained.

Figure 7:
FIG. 7 is a schematic diagram showing an example of the subgraph extracted from the graph shown in FIG. 6.

The subgraphs shown in FIG. 5, the subgraph shown in FIG. 7, and the subgraphs shown in FIG. 10 have different subgraph structures, respectively. However, in any of these structures, each subgraph has a node at one end that has text containing one of two words having a relationship and a node at the other end that has text containing the other of the two related words.

In the following, the case where the subgraph extraction unit 5 has extracted the subgraphs shown in FIG. 5, the subgraph shown in FIG. 7, and the subgraphs shown in FIG. 10 will be described by way of example. The subgraph extraction unit 5 stores the subgraphs extracted from the document structure graph in the subgraph storage unit 6. The subgraph storage unit 6 is a storage device that stores subgraphs extracted from a document structure graph by the subgraph extraction unit 5.

The subgraph counting unit 7 reads the subgraphs from the subgraph storage unit 6. The subgraph counting unit 7 then counts the number of subgraphs for each subgraph structure.

For example, the subgraphs shown in FIG. 5 have a structure in which a node with the <Item> tag and text containing the word of an upper level in the inter-word relationship information is connected to a node with the <UL> tag by a link in a predetermined orientation, and the node is further connected by a link in the predetermined orientation to a node with the <Item> tag and text containing the word of a lower level in the inter-word relationship information. The subgraph counting unit 7 counts the number of subgraphs having this structure among the subgraphs read from the subgraph storage unit 6.

Further, for example, the subgraph shown in FIG. 7 has a structure in which a node with the <Header1> tag and text containing the word of an upper level in the inter-word relationship information is connected to a node with the <Header2> tag and text containing the word of a lower level in the inter-word relationship information by a link in a predetermined orientation. The subgraph counting unit 7 counts the number of subgraphs having this structure among the subgraphs read from the subgraph storage unit 6.

Further, for example, the subgraphs shown in FIG. 10 have a structure in which a node with the <Table> tag and text containing the word of an upper level in the inter-word relationship information is connected to a node with the <Column> tag and text "Name" by a link in a predetermined orientation, and the node is further connected by a link in the predetermined orientation to a node with the <Cell> tag and text containing the word of a lower level in the inter-word relationship information. The subgraph counting unit 7 counts the number of subgraphs having this structure among the subgraphs read from the subgraph storage unit 6.

In this manner, the subgraph counting unit 7 counts the number of subgraphs extracted by the subgraph extraction unit 5 for each subgraph structure.

The subgraph counting unit 7 then selects the subgraph structure for which the count result is not smaller than a threshold value. The threshold value can be determined in advance as a constant. In the present example, it is assumed that the subgraph counting unit 7 has selected the structure shown in FIG. 5 and the structure shown in FIG. 10.

The rule creation unit 8 creates a rule for extracting a subgraph having the same structure as the subgraph from the document structure graph. In the present embodiment, for each structure selected by the subgraph counting unit 7, the rule creation unit 8 creates a rule for extracting a subgraph having that structure from the document structure graph, on the basis of the subgraph corresponding to that structure.

In the present example, as the subgraph structures, the structure shown in FIG. 5 and the structure shown in FIG. 10 have been selected by the subgraph counting unit 7.

In this case, the rule creation unit 8 creates a rule for extracting from the document structure graph any subgraph having the same structure as that shown in FIG. 5. At this time, the rule creation unit 8 extracts one subgraph that corresponds to the structure shown in FIG. 5. Regardless of which subgraph is extracted, the result of the replacement processing described below will be the same. Therefore, the rule creation unit 8 can arbitrarily select one subgraph from among the subgraphs corresponding to the structure shown in FIG. 5. The rule creation unit 8 replaces, in the subgraph, the text containing the word of a lower level in the inter-word relationship information with a first predetermined sign ("XXX" in the present example). The rule creation unit 8 also replaces, in the subgraph, the text containing the word of an upper level in the inter-word relationship information with a predetermined sign ("YYY" in the present example). The result of this replacement processing constitutes the rule for extracting from the document structure graph a subgraph having the same structure as that shown in FIG. 5. In the present example, the rule creation unit 8 creates the rule shown in FIG. 11 by the above-described replacement processing.

Figure 12:
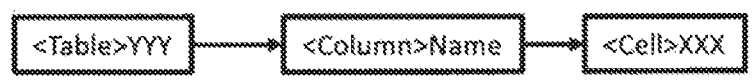
FIG. 12 is a schematic diagram showing an example of a rule.

Similarly, the rule creation unit 8 creates a rule for extracting from the document structure graph any subgraph having the same structure as that shown in FIG. 10. At this time, the rule creation unit 8 extracts one subgraph that corresponds to the structure shown in FIG. 10. Regardless of which subgraph is extracted, the result of the replacement processing as described above will be the same. Therefore, the rule creation unit 8 can arbitrarily select one subgraph from among the subgraphs corresponding to the structure shown in FIG. 10. The rule creation unit 8 replaces, in the subgraph, the text containing the word of a lower level in the inter-word relationship information with a first predetermined sign ("XXX" in the present example). The rule creation unit 8 also replaces, in the subgraph, the text containing the word of an upper level in the inter-word relationship information with a predetermined sign ("YYY" in the present example). The result of this replacement processing constitutes the rule for extracting from the document structure graph a subgraph having the same structure as that shown in FIG. 10. In the present example, the rule creation unit 8 creates the rule shown in FIG. 12 by the above-described replacement processing.

The rule creation unit 8 stores each created rule in the rule storage unit 9. The rule storage unit 9 is a storage device that stores rules created by the rule creation unit 8.

The knowledge addition unit 10 reads from the rule storage unit 9 each rule created by the rule creation unit 8. Then, for each rule, the knowledge addition unit 10 extracts a subgraph from the document structure graph in accordance with the rule. At this time, the knowledge addition unit 10 extracts from the document structure graph any subgraph that matches the rule by assuming that the portions corresponding to "XXX", "YYY" in the rule are arbitrary text. The same applies to any rule used. However, the subgraphs extracted by the subgraph extraction unit 5 on the basis of the inter-word relationship information do not need to be extracted, even if they match the rule.

Here, a description will be made by taking the rule shown in FIG. 11 as an example. The rule shown in FIG. 11 indicates to extract any subgraph that satisfies the following conditions: "a node with the <Item> tag and arbitrary text is connected to a node with the <UL> tag by a link in a predetermined orientation, and the node is further connected by a link in the predetermined orientation to a node with the <Item> tag and arbitrary text." The knowledge addition unit 10 extracts subgraphs that satisfy the above conditions in accordance with the rule shown in FIG. 11. However, as noted above, the subgraphs extracted by the subgraph extraction unit 5 on the basis of the inter-word relationship information may be excluded from the extraction.

Figure 11:
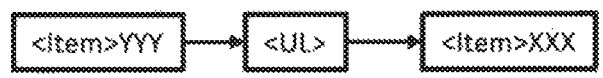
FIG. 11 is a schematic diagram showing an example of a rule.
Figure 13:
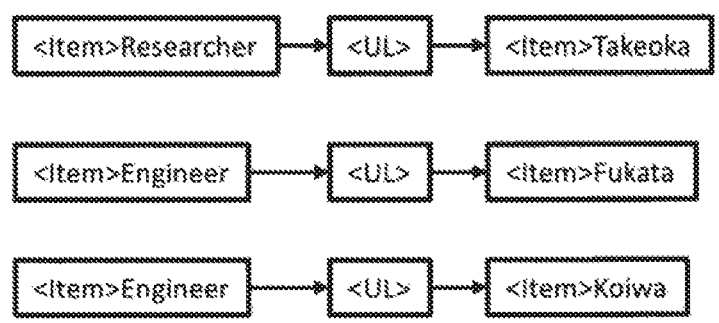
FIG. 13 is a schematic diagram showing examples of subgraphs extracted in accordance with a rule.

In accordance with the rule shown in FIG. 11, the knowledge addition unit 10 is able to obtain three subgraphs shown in FIG. 13 from the document structure graph illustrated in FIG. 2.

For another rule as well, the knowledge addition unit 10 extracts subgraphs from the document structure graph in accordance with the rule.

The knowledge addition unit 10 further extracts new knowledge from the subgraphs extracted in accordance with the rule. The knowledge addition unit 10 extracts, in the extracted subgraphs, knowledge that the text corresponding to YYY and the text corresponding to XXX have a relationship. In the present example, the subgraph extraction unit 5 extracts subgraphs on the basis of the knowledge indicating the is-a relationship, and the knowledge addition unit 10 extracts subgraphs in accordance with the rule created on the basis of the subgraphs. Accordingly, the knowledge addition unit 10 extracts, in the extracted subgraphs, knowledge that the text corresponding to YYY and the text corresponding to XXX have the is-a relationship and that the text corresponding to YYY is at an upper level and the text corresponding to XXX is at a lower level. It should be noted that the text corresponding to XXX and the text corresponding to YYY are contained in nodes at both ends of the subgraph extracted in accordance with the rule.

Figure 14:
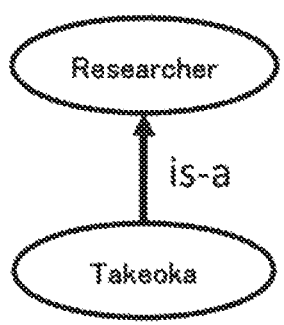
FIG. 14 is a schematic diagram showing new knowledge obtained from the first subgraph shown in FIG. 13.

For example, the knowledge addition unit 10 extracts, from the first subgraph shown in FIG. 13, new knowledge that "Researcher" and "Takeoka" have the is-a relationship and that "Researcher" is at the upper level and "Takeoka" is at the lower level. This knowledge can be represented as shown in FIG. 14.

Figure 15:
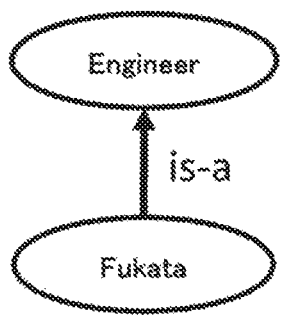
FIG. 15 is a schematic diagram showing new knowledge obtained from the second subgraph shown in FIG. 13.

Further, for example, the knowledge addition unit 10 extracts, from the second subgraph shown in FIG. 13, new knowledge that "Engineer" and "Fukata" have the is-a relationship and that "Engineer" is at the upper level and "Fukata" is at the lower level. This knowledge can be represented as shown in FIG. 15.

Figure 16:
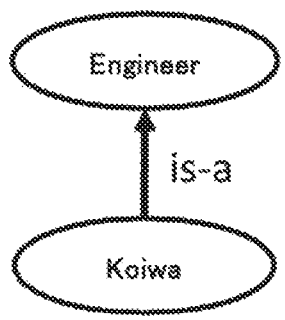
FIG. 16 is a schematic diagram showing new knowledge obtained from the third subgraph shown in FIG. 13.

Further, for example, the knowledge addition unit 10 extracts, from the third subgraph shown in FIG. 13, new knowledge that "Engineer" and "Koiwa" have the is-a relationship and that "Engineer" is at the upper level and "Koiwa" is at the lower level. This knowledge can be represented as shown in FIG. 16.

Figure 17:
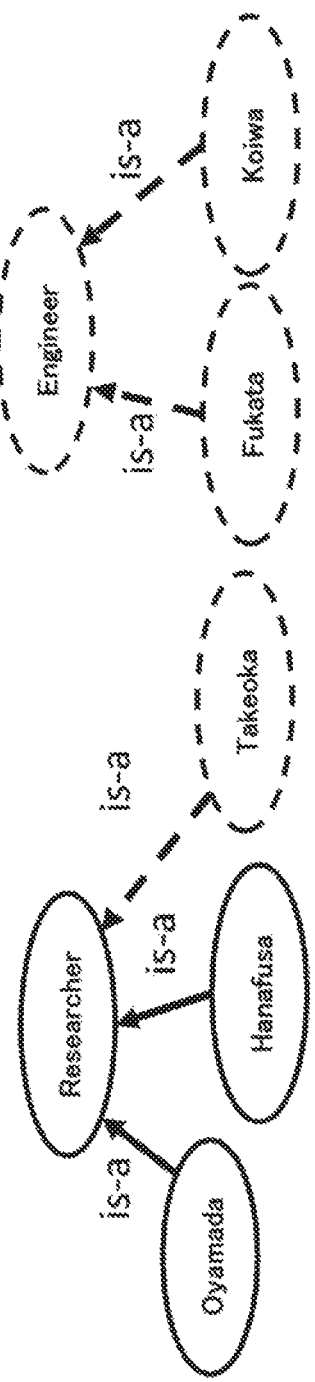
FIG. 17 is a schematic diagram showing an example of the inter-word relationship information after the new knowledge has been added thereto.

The knowledge addition unit 10 adds the new knowledge thus extracted from the subgraphs to the inter-word relationship information stored in the inter-word relationship information storage unit 3. FIG. 17 shows the inter-word relationship information after the new knowledge has been added to the inter-word relationship information shown in FIG. 4. In FIG. 17, the nodes and links corresponding to the added knowledge are shown in dashed lines for convenience.

The data reading unit 4, the subgraph extraction unit 5, the subgraph counting unit 7, the rule creation unit 8, and the knowledge addition unit 10 are implemented by, for example, a processor (e.g., a central processing unit (CPU), a graphics processing unit (GPU), a field-programmable gate array (FPGA)) of a computer that operates in accordance with the knowledge expansion program. In this case, the CPU may read the knowledge expansion program from a program storage device or other program recording medium and operate as the data reading unit 4, the subgraph extraction unit 5, the subgraph counting unit 7, the rule creation unit 8, and the knowledge addition unit 10 in accordance with the knowledge expansion program.

Figure 18:
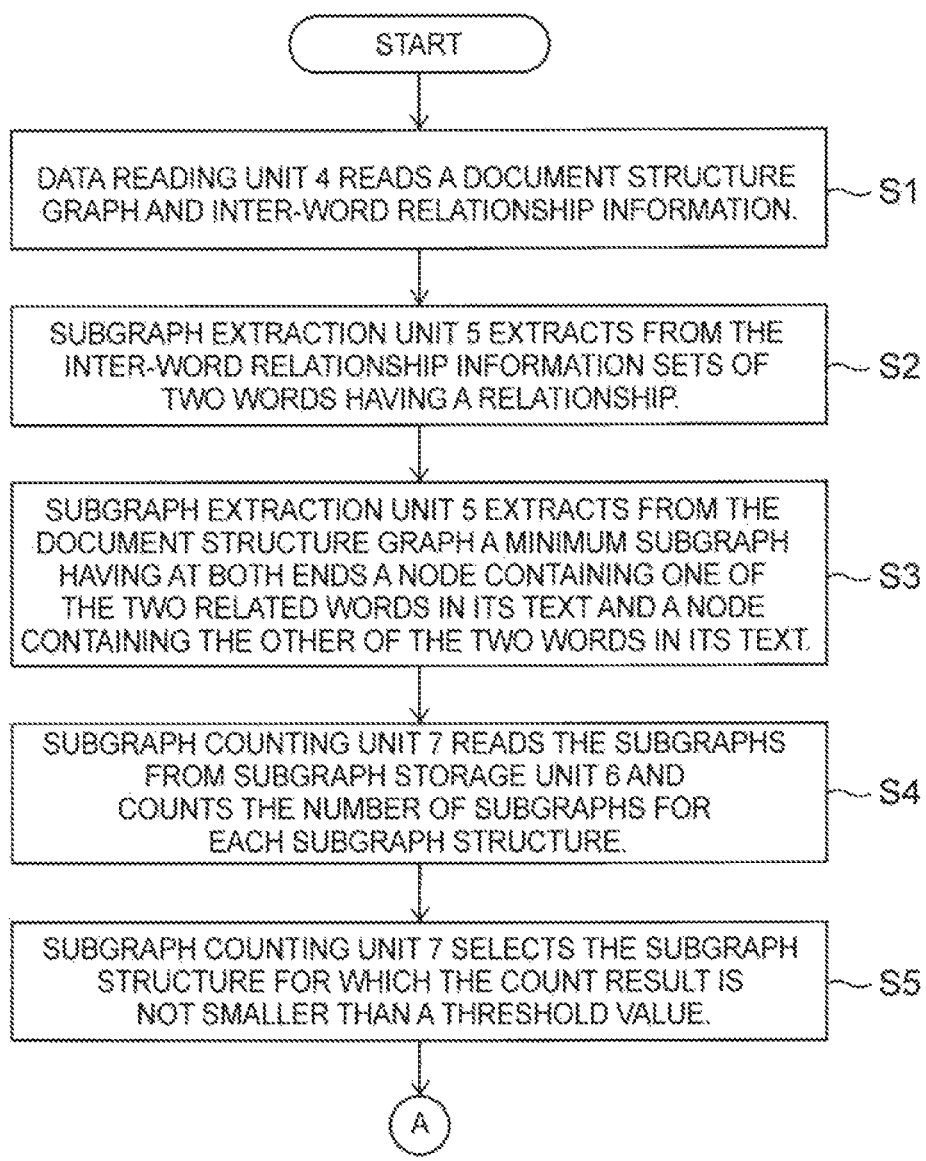
FIG. 18 is a flowchart illustrating an example of the course of processing of the knowledge expansion system of the first embodiment of the present invention.
Figure 19:
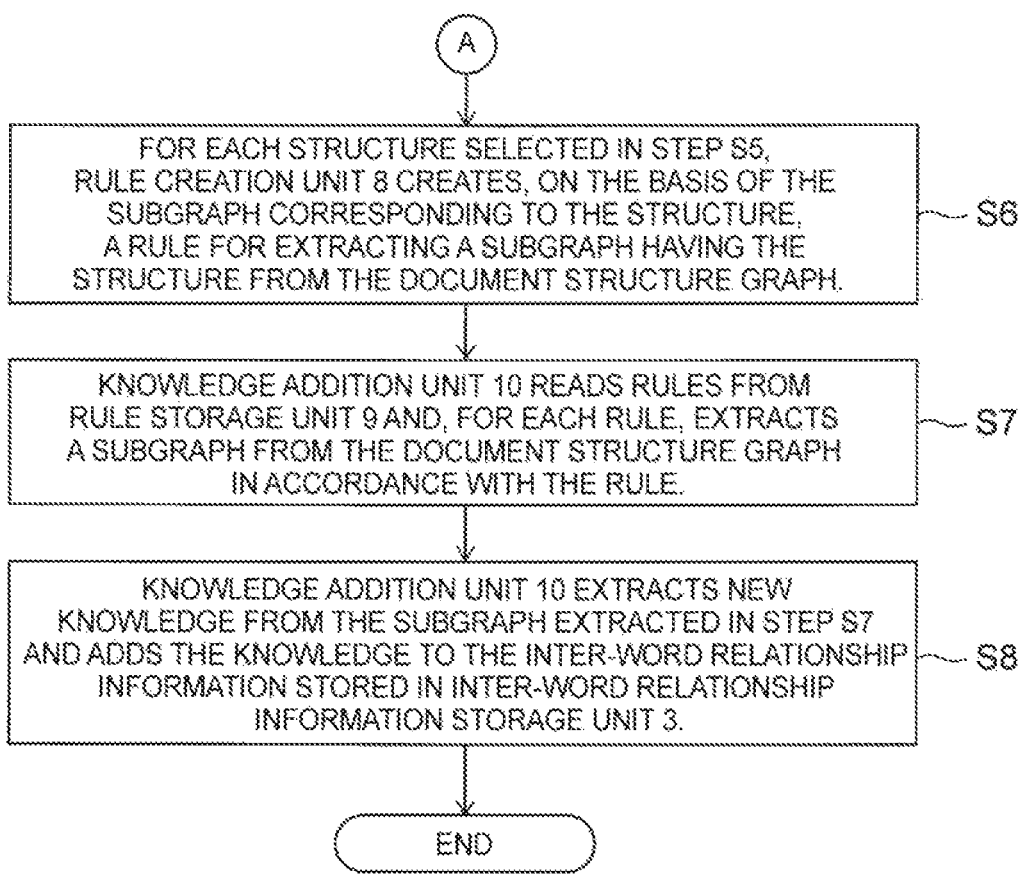
FIG. 19 is a flowchart illustrating the example of the course of processing of the knowledge expansion system of the first embodiment of the present invention.

The course of processing of the first embodiment will now be described. FIGS. 18 and 19 are flowcharts showing an exemplary course of processing of the knowledge expansion system 1 of the first embodiment of the present invention. In the following, the description of the matters already described will be omitted as appropriate.

It is here assumed that the document structure graph has been stored in advance in the document structure graph storage unit 2 and the inter-word relationship information in the inter-word relationship information storage unit 3 by the administrator.

Firstly, the data reading unit 4 reads the document structure graph from the document structure graph storage unit 2 and the inter-word relationship information from the inter-word relationship information storage unit 3 (step S1).

Next, the subgraph extraction unit 5 extracts from the inter-word relationship information respective sets of two words having a relationship (step S2).

Further, the subgraph extraction unit 5 extracts from the document structure graph a minimum subgraph that has at both ends a node containing one of two words having a relationship in its text and a node containing the other of the two words in its text (step S3). If there are two or more subgraphs to be extracted, the subgraph extraction unit 5 extracts all those subgraphs from the document structure graph. Further, the subgraph extraction unit 5 executes the processing in step S3 for each set of words extracted in step S2. The subgraph extraction unit 5 stores each subgraph obtained in step S3 in the subgraph storage unit 6.

Next, the subgraph counting unit 7 reads the subgraphs from the subgraph storage unit 6 and counts the number of subgraphs for each subgraph structure (step S4).

Further, the subgraph counting unit 7 selects the subgraph structure for which the count result in step S4 is not smaller than a threshold value (step S5).

Next, the rule creation unit 8 creates, for each structure selected in step S5, a rule for extracting a subgraph of the structure from the document structure graph on the basis of the subgraph corresponding to the structure (step S6). The rule creation unit 8 stores each created rule in the rule storage unit 9.

Next, the knowledge addition unit 10 reads the rules from the rule storage unit 9 and, for each rule, extracts subgraphs from the document structure graph in accordance with the rule (step S7).

The knowledge addition unit 10 then extracts new knowledge from the subgraphs extracted in step S7 and adds the knowledge to the inter-word relationship information stored in the inter-word relationship information storage unit 3 (step S8).

According to the present embodiment, the subgraph extraction unit 5 extracts a subgraph from the document structure graph on the basis of the knowledge indicated by the given inter-word relationship information. Then, the rule creation unit 8 creates a rule for extracting from the document structure graph a subgraph having the same structure as that of the subgraph. Further, the knowledge addition unit 10 extracts a new subgraph from the document structure graph in accordance with the rule, and adds the knowledge obtained by the subgraph to the given inter-word relationship information. The knowledge expansion system 1 is thus able to expand the knowledge included in the given inter-word relationship information.

While subgraphs are extracted by the subgraph extraction unit 5 on the basis of the inter-word relationship information, when only a few subgraphs of the same structure have been extracted, those subgraphs may not be related to the relationship between two words. That is, in the case where the number of extracted subgraphs having the same structure is small, it may be possible that the subgraphs merely contain the two words as text, not representing the relationship between the two words. Even if the rule creation unit 8 creates a rule on the basis of such subgraphs, the resultant rule may not necessarily be able to derive appropriate knowledge. In the above embodiment, the subgraph counting unit 7 counts the number of subgraphs stored in the subgraph storage unit 6 (in other words, the number of subgraphs extracted by the subgraph extraction unit 5) for each subgraph structure, and selects the subgraph structure for which the count result is equal to or greater than the threshold value. The rule creation unit 8 then creates, for each selected structure, a rule for extracting a subgraph of that structure from the document structure graph. It is therefore possible to obtain a rule for deriving appropriate knowledge.

Embodiment 2

Figure 20:
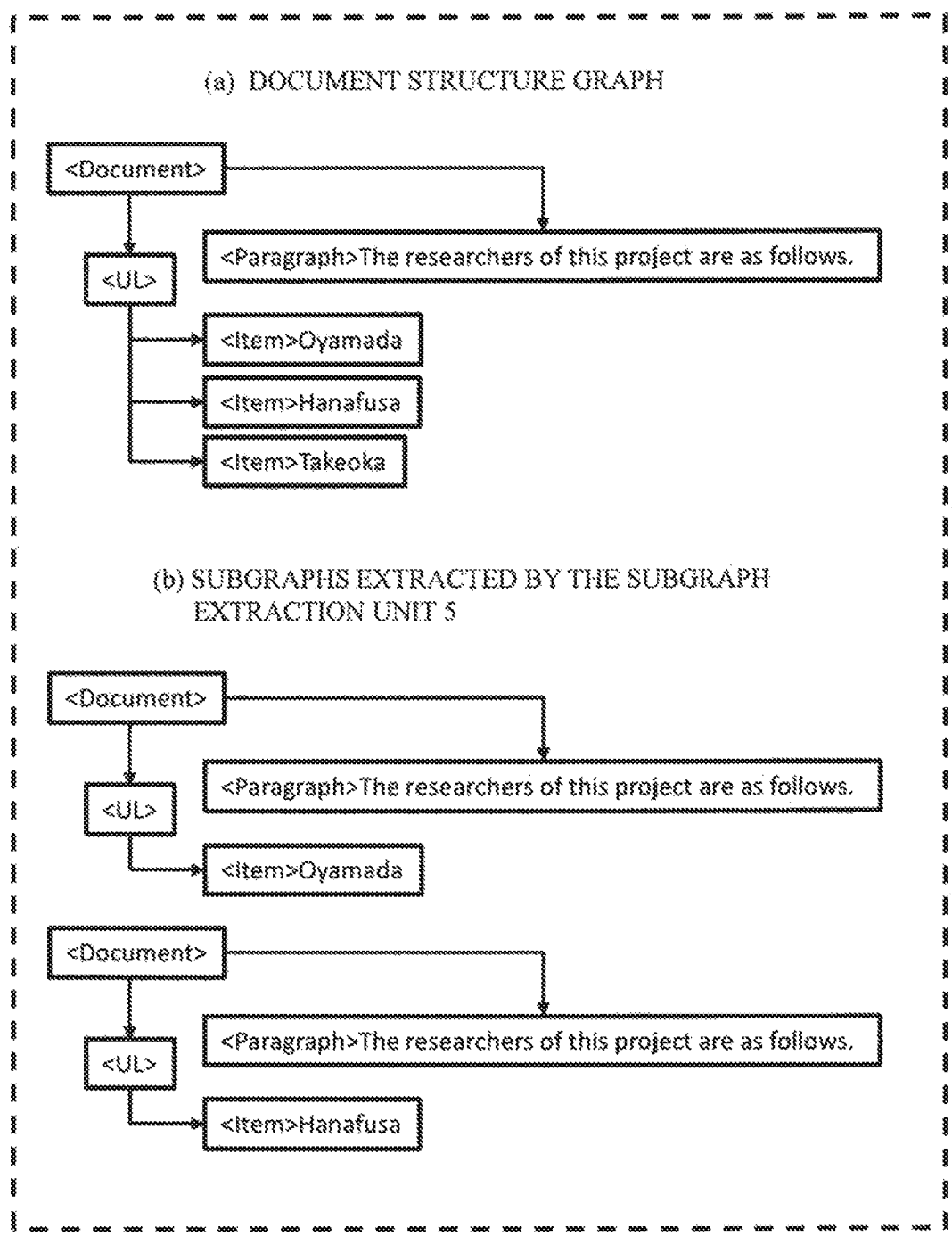
FIG. 20 is a schematic diagram showing an example of the case where unnatural knowledge is obtained.
Figure 21:
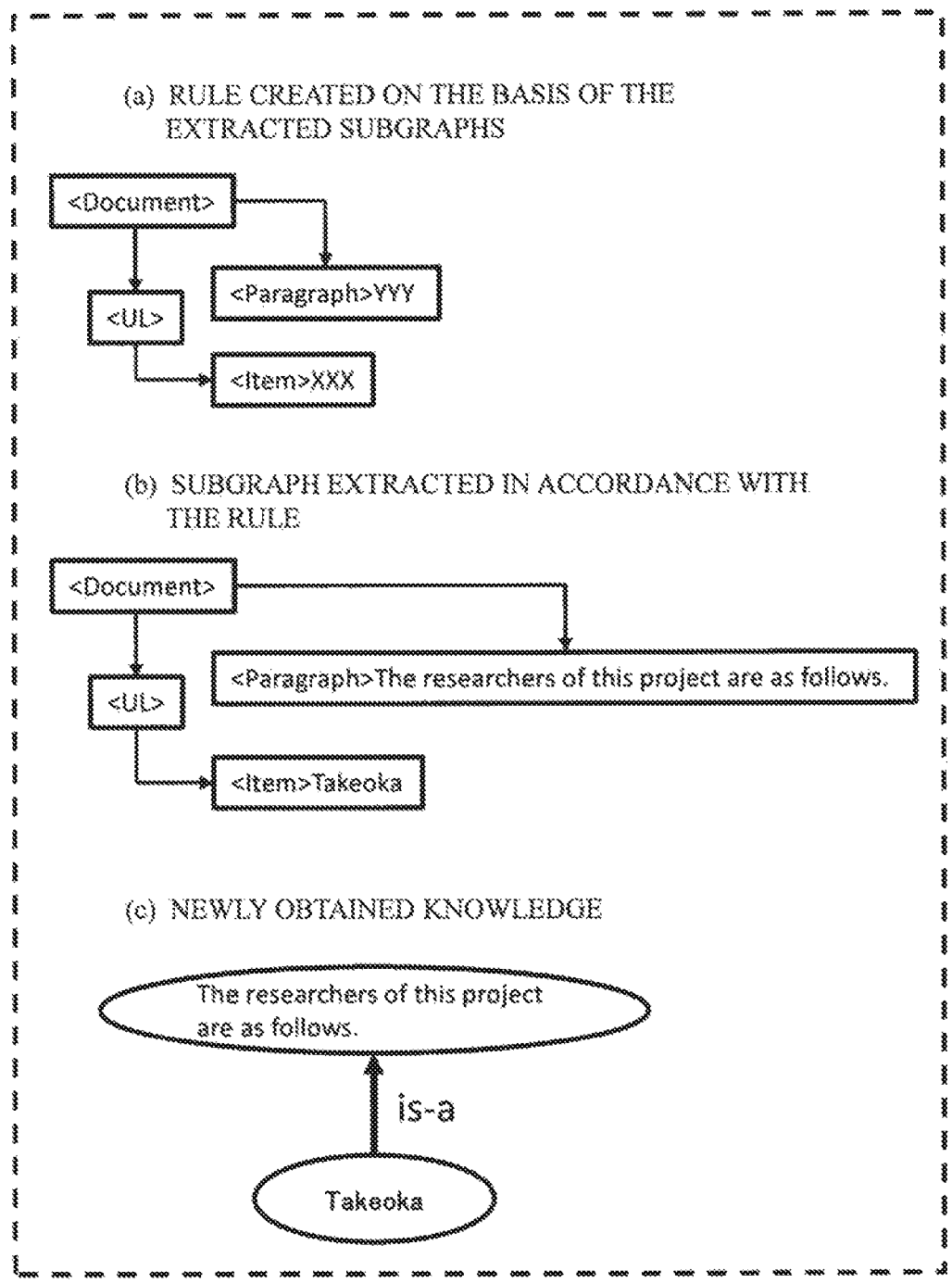
FIG. 21 is a schematic diagram showing the example of the case where unnatural knowledge is obtained.

In the first embodiment, the knowledge addition unit 10 extracts from a document structure graph any subgraph that matches a rule, assuming that the portions corresponding to "XXX" and "YYY" in the rule are arbitrary text. The knowledge addition unit 10 then extracts knowledge that the text corresponding to YYY and the text corresponding to XXX in the extracted subgraph have a relationship. At this time, there is a case where the text corresponding to YYY or the text corresponding to XXX is a sentence or the like. In such a case, the knowledge that the text corresponding to YYY and the text corresponding to XXX have the is-a relationship, for example, may be unnatural. FIGS. 20 and 21 are schematic diagrams illustrating an example of the case where unnatural knowledge is obtained.

Suppose that the document structure graph shown in FIG. 20(a) has been given. This document structure graph has a node containing a sentence "The researchers of this project are as follows." Further, suppose that the inter-word relationship information shown in FIG. 4 has been given. In this case, the subgraph extraction unit 5 extracts the subgraphs shown in FIG. 20(b). Then, on the basis of these subgraphs, the rule creation unit 8 creates a rule shown in FIG. 21(a). In accordance with this rule, the knowledge addition unit 10 extracts from the document structure graph (see FIG. 20(a)) a subgraph shown in FIG. 21(b). From the subgraph shown in FIG. 21(b), knowledge shown in FIG. 21(c) is obtained. However, FIG. 21(c) indicates that there is the is-a relationship between two nodes, one having the word "Takeoka" and the other having the sentence "The researchers of this project are as follows." It is unnatural that two nodes having the is-a relationship contain a sentence.

The knowledge expansion system of the second embodiment of the present invention prevents unnatural knowledge as described above from being obtained.

Figure 22:
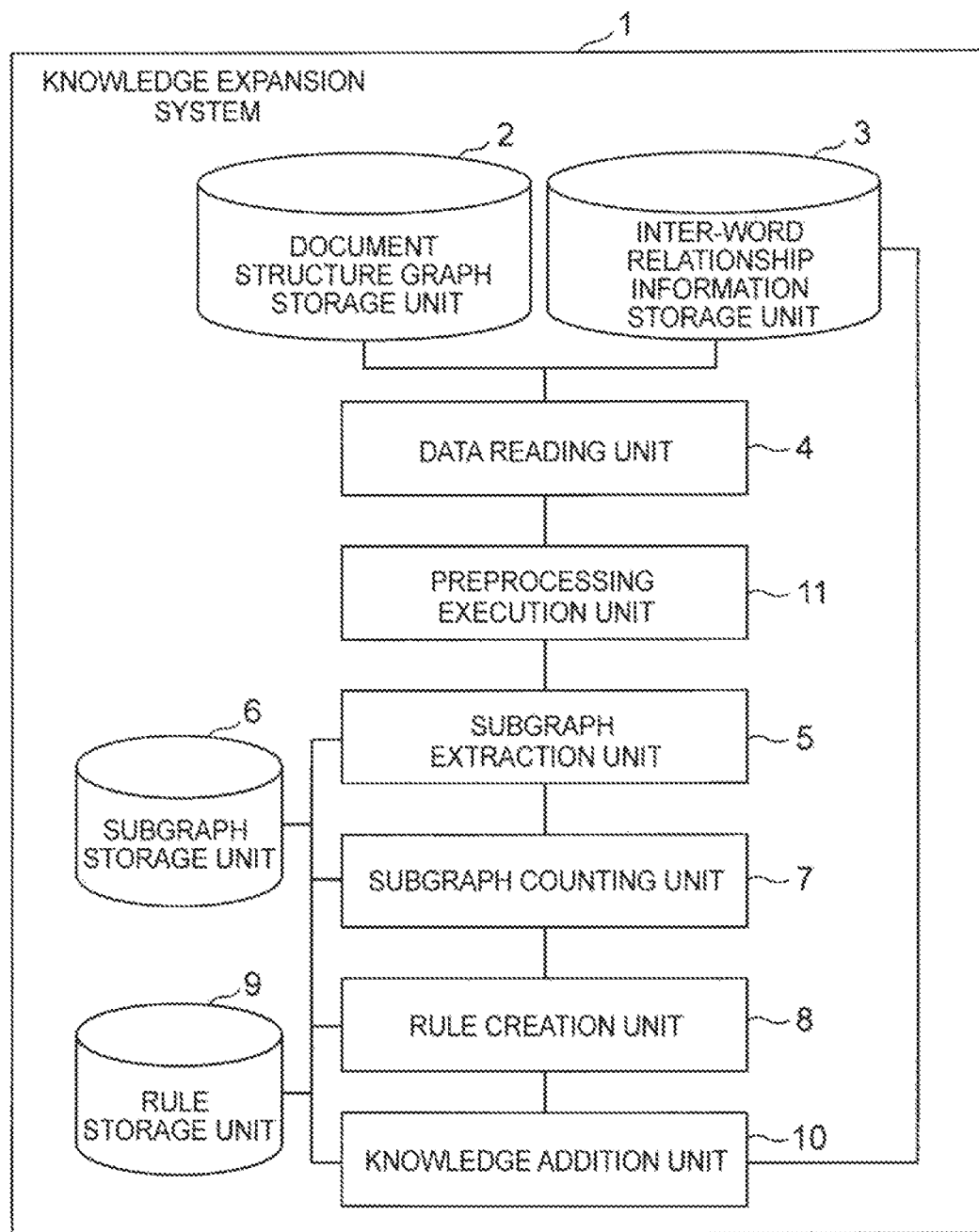
FIG. 22 is a block diagram showing an exemplary configuration of the knowledge expansion system of a second embodiment of the present invention.

FIG. 22 is a block diagram showing an exemplary configuration of the knowledge expansion system of the second embodiment of the present invention. The elements similar to those shown in FIG. 1 are denoted by the same signs as in FIG. 1, and the description will be omitted as appropriate. The knowledge expansion system 1 of the second embodiment includes a document structure graph storage unit 2, an inter-word relationship information storage unit 3, a data reading unit 4, a subgraph extraction unit 5, a subgraph storage unit 6, a subgraph counting unit 7, a rule creation unit 8, a rule storage unit 9, and a knowledge addition unit 10, and further includes a preprocessing execution unit 11.

The preprocessing execution unit 11 performs preprocessing of transforming a given document structure graph prior to extraction by the subgraph extraction unit 5 of subgraphs from the document structure graph.

Specifically, in the case where a node in a given document structure graph contains text having a dependency relationship, the preprocessing execution unit 11 performs dependency analysis on the text to divide the node into a plurality of nodes. The preprocessing execution unit 11 then assigns, to respective nodes obtained by dividing the node, information indicating the text element type, obtained by the dependency analysis, as node type information. In the case where a divided node contains text, the preprocessing execution unit 11 divides the node into a plurality of nodes such that the text is divided into words.

As to the node containing text having no dependency relationship or the node containing no text, the preprocessing execution unit 11 does not execute the processing of dividing the node into a plurality of nodes.

Figure 23:
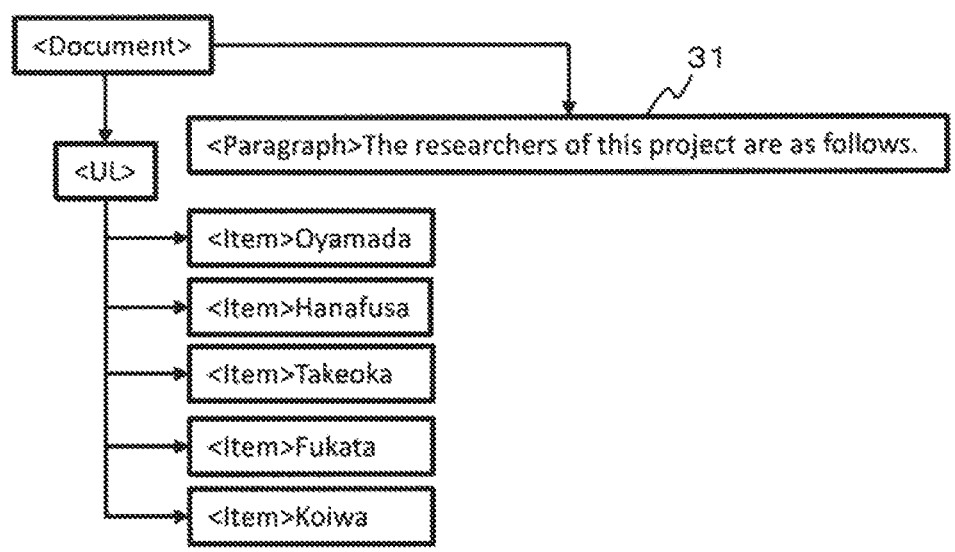
FIG. 23 is a schematic diagram showing an example of a document structure graph before transformation.
Figure 24:
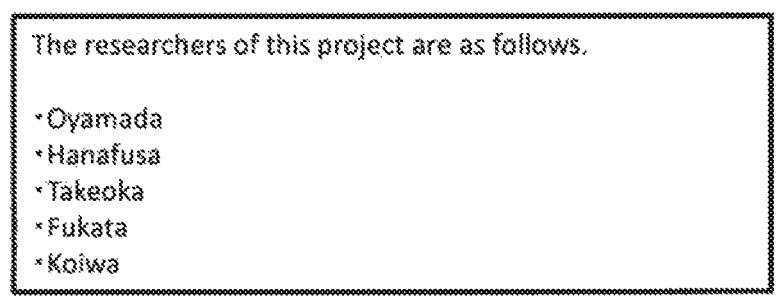
FIG. 24 is a schematic diagram showing a document corresponding to the document structure graph shown in FIG. 23.

An example of the case for the preprocessing execution unit 11 to transform the document structure graph will be described specifically. FIG. 23 is a schematic diagram showing an example of a given document structure graph (i.e., the document structure graph before being transformed by the preprocessing execution unit 11). The document structure graph shown in FIG. 23 corresponds to a document shown in FIG. 24. That is, the document structure graph shown in FIG. 23 indicates the document structure of the document shown in FIG. 24.

Of the nodes shown in FIG. 23, the node with the <Document> tag and the node with the <UL> tag contain no text. Further, each node with the <Item> tag has a word as the text, which has no dependency relationship. Thus, for these nodes, the preprocessing execution unit 11 does not execute the processing of dividing the node into a plurality of nodes.

On the other hand, of the nodes shown in FIG. 23, a node 31 with the <Paragraph> tag has the text "The researchers of this project are as follows." This text has the dependency relationship. Accordingly, the preprocessing execution unit 11 divides the node 31 into a plurality of nodes.

Figure 25:
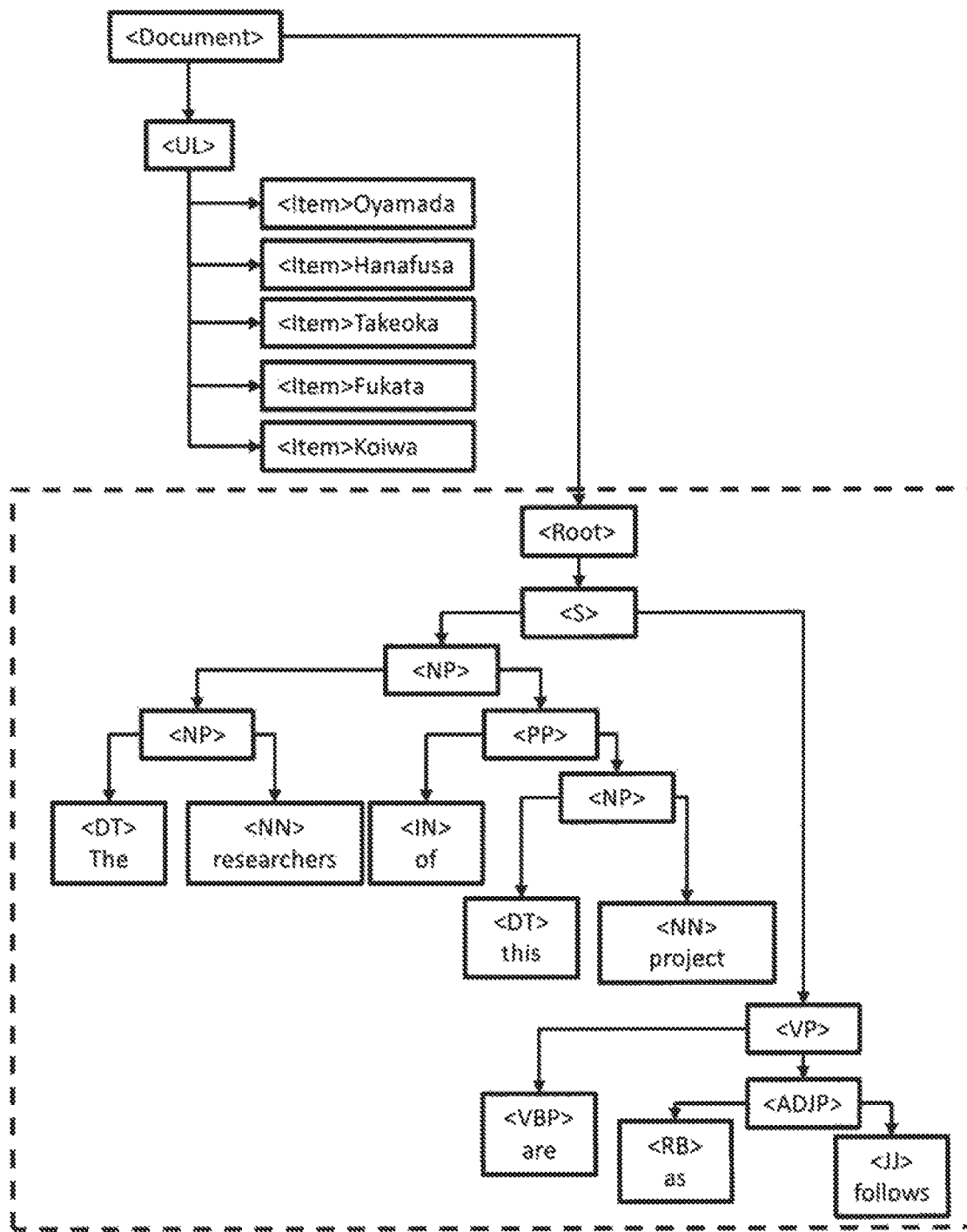
FIG. 25 is a schematic diagram showing an example of the document structure graph after transformation.

FIG. 25 is a schematic diagram showing an example of the document structure graph after the node 31 has been divided into a plurality of nodes. In FIG. 25, the nodes delimited by the broken line are the plurality of nodes divided from the node 31 (see FIG. 23). The preprocessing execution unit 11 performs dependency analysis on the text in the node 31 to divide the text into individual words, generates nodes containing the respective words, and also generates nodes containing no text for connecting the nodes containing the words, to generate links connecting the nodes. To each node thus generated, the preprocessing execution unit 11 assigns information indicating the type of the element of the text obtained by the dependency analysis, as the node type information. The plurality of nodes obtained by dividing one node may include a node that has the node type information and no text. As previously explained, the node type information is described as being represented as a tag.

Examples of the node type information assigned to a plurality of nodes divided from a node 31 will be described with reference to FIG. 25.

The <Root> tag means that it is the root of the plurality of nodes divided from the node 31. The <S> tag means a subject. The <NP> tag means a noun phrase. The <DT> tag means a determinative. The <NN> tag means a noun. The <PP> tag means a particle phrase. The <IN> tag means a preposition. The <VP> tag means a verb phrase. The <VBP> tag means a verb. The <ADJP> tag means an adjective phrase. The <RB> tag means an adverb. The <JJ> tag means an adjective. It should be noted that the node type information assigned to the nodes divided from one node is not limited to the example shown in FIG. 25.

As a result of the above-described preprocessing performed by the preprocessing execution unit 11, there exists no node that contains text having the dependency relationship (see, for example, FIG. 25).

The operations of the subgraph extraction unit 5, the subgraph counting unit 7, the rule creation unit 8, and the knowledge addition unit 10 after the preprocessing execution unit 11 has performed preprocessing on the document structure graph are similar to those in the first embodiment.

The preprocessing execution unit 11 is implemented by, for example, a CPU of a computer that operates in accordance with the knowledge expansion program, as with the data reading unit 4, the subgraph extraction unit 5, the subgraph counting unit 7, the rule creation unit 8, and the knowledge addition unit 10.

The subgraphs and the like in the case where the document structure graph has been transformed as shown in FIG. 25 will be described specifically below. In the following example, it is assumed that the data reading unit 4 has read the inter-word relationship information shown in FIG. 4 from the inter-word relationship information storage unit 3. The subgraph extraction unit 5 extracts subgraphs from the preprocessed document structure graph (see FIG. 25) on the basis of the inter-word relationship information shown in FIG. 4. The subgraphs thus obtained are shown in FIG. 26.

Figure 26:
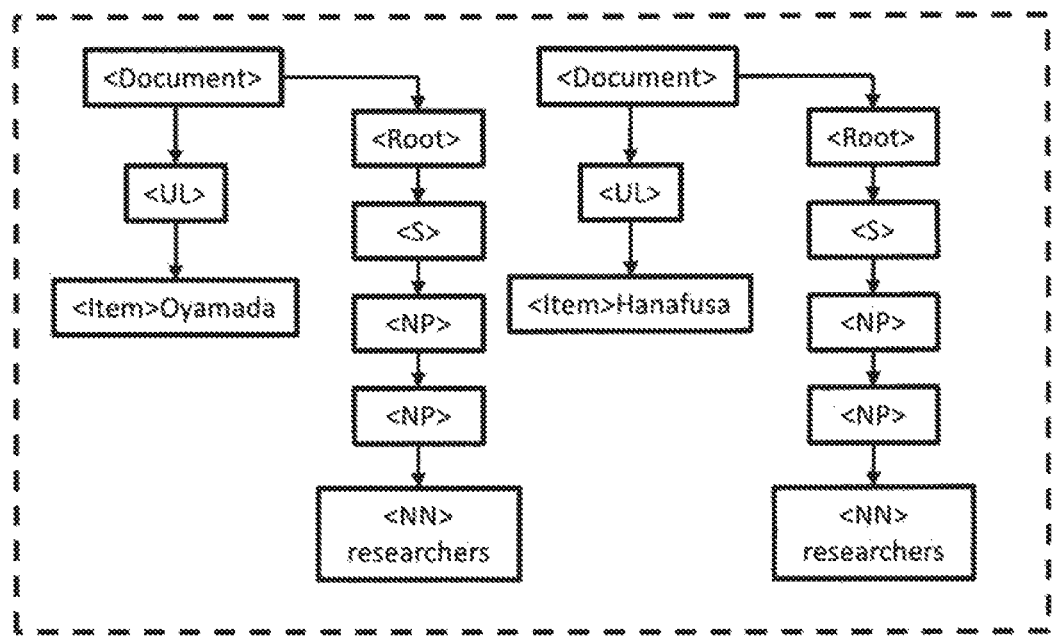
FIG. 26 is a schematic diagram showing examples of subgraphs extracted from the graph shown in FIG. 25.
Figure 27:
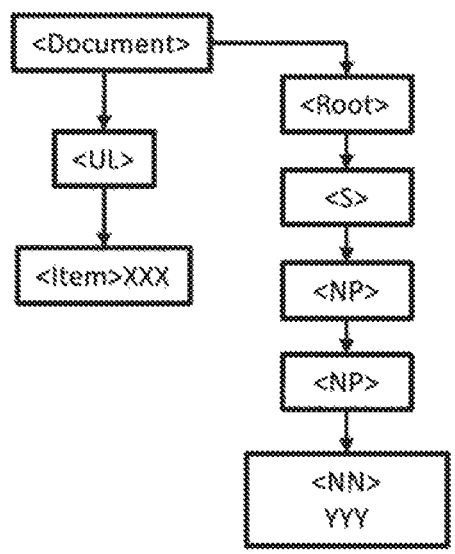
FIG. 27 is a schematic diagram showing an example of a rule.
Figure 28:
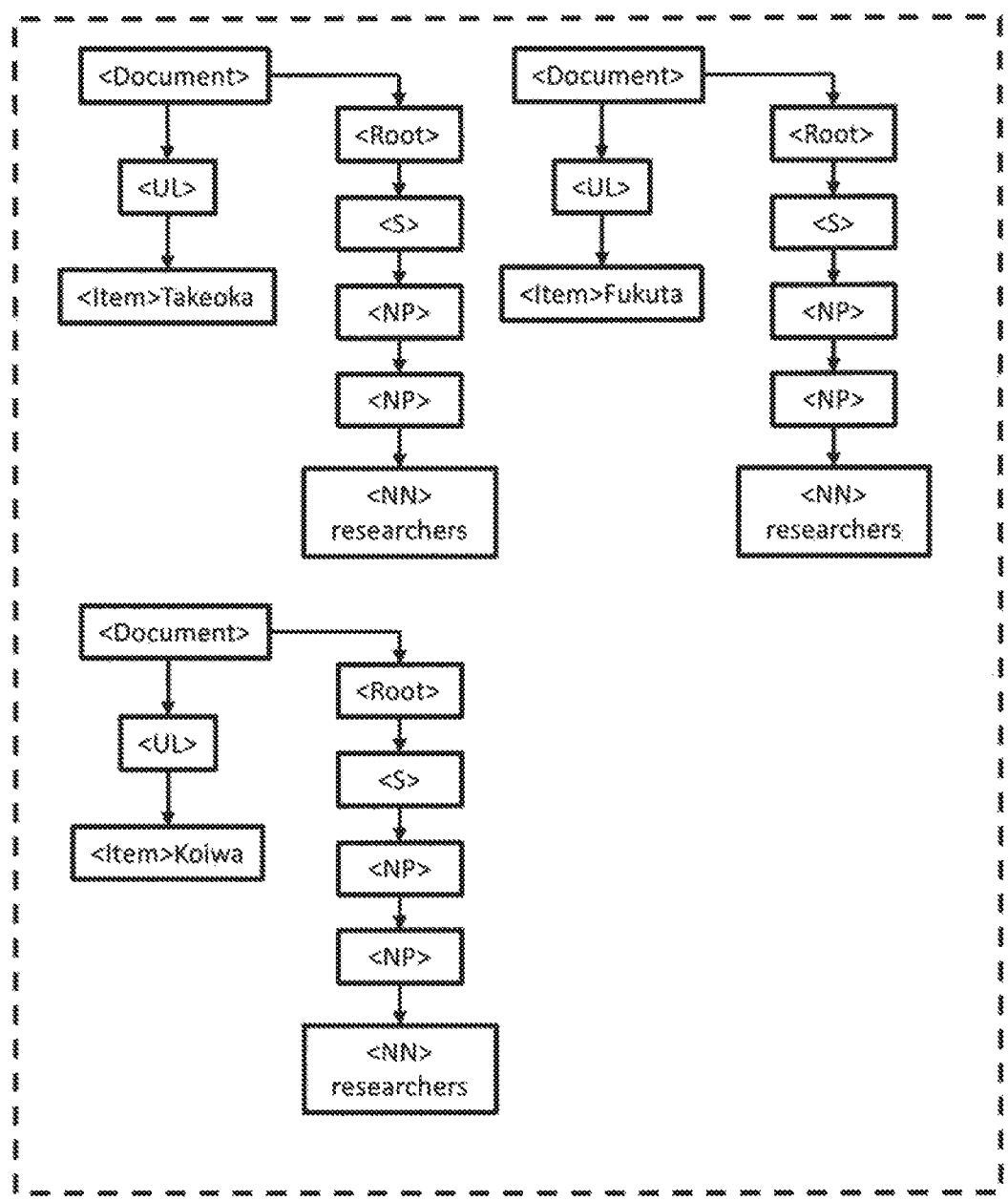
FIG. 28 is a schematic diagram showing examples of subgraphs extracted in accordance with a rule.

It is also assumed that the subgraph counting unit 7 has selected the subgraph structure shown in FIG. 26. In this case, the rule creation unit 8 creates a rule shown in FIG. 27. Then, the knowledge addition unit 10, in accordance with the rule, extracts three subgraphs shown in FIG. 28 from the document structure graph shown in FIG. 25. Further, from these three subgraphs, the knowledge addition unit 10 extracts new knowledge shown in FIG. 29. At this time, in the case where the text corresponding to YYY or XXX in the subgraph is in the plural form, the knowledge addition unit 10 may correct it to the singular form. In the present example, it is assumed that when extracting the knowledge shown in FIG. 29, the knowledge addition unit 10 corrects "researchers" shown in FIG. 28 to the singular form "researcher".

Figure 29:
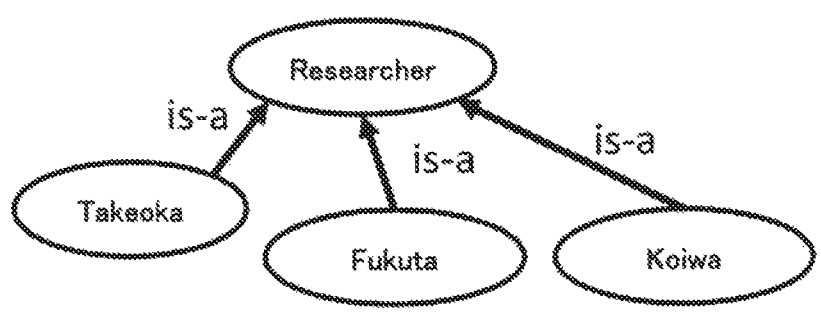
FIG. 29 is a schematic diagram showing new knowledge obtained from the subgraphs shown in FIG. 28.
Figure 30:
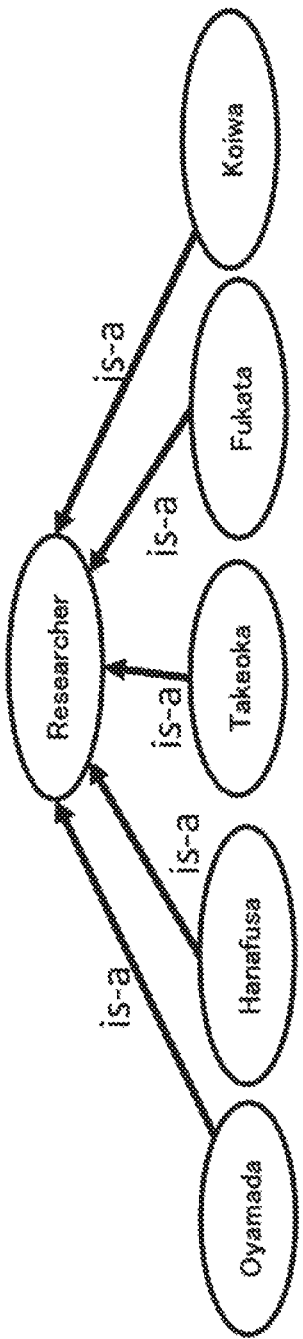
FIG. 30 is a schematic diagram showing an example of the inter-word relationship information after the new knowledge has been added thereto.

The knowledge addition unit 10 adds the new knowledge shown in FIG. 29 to the given inter-word relationship information (see FIG. 4). This results in the inter-word relationship information shown in FIG. 30.

According to the second embodiment, advantageous effects similar to those in the first embodiment are obtained. Further, in the second embodiment, in the case where a node in the given document structure graph contains text having a dependency relationship, the preprocessing execution unit 11 performs dependency analysis on the text to divide the node into a plurality of nodes. Further, to each of the plurality of nodes obtained by dividing the node, the preprocessing execution unit 11 assigns information indicating the type of the element of the text obtained by the dependency analysis, as the node type information. This eliminates a node containing text having the dependency relationship from the document structure graph. Accordingly, the second embodiment prevents unnatural knowledge as illustrated in FIG. 21(c) from being derived as new knowledge. The second embodiment ensures that appropriate knowledge as illustrated in FIG. 29 can be obtained as the new knowledge.

Embodiment 3

A knowledge expansion system of a third embodiment of the present invention prevents unnatural knowledge as illustrated in FIG. 21(c) from being obtained. The third embodiment is similar to the second embodiment in this regard.

The knowledge expansion system of the third embodiment of the present invention can be represented by the block diagram shown in FIG. 1, as with the knowledge expansion system of the first embodiment, so the third embodiment will be described with reference to FIG. 1.

The document structure graph storage unit 2, the inter-word relationship information storage unit 3, the data reading unit 4, the subgraph extraction unit 5, the subgraph storage unit 6, the subgraph counting unit 7, the rule creation unit 8, and the rule storage unit 9 in the third embodiment are similar to those in the first embodiment.

The knowledge addition unit 10 in the third embodiment extracts subgraphs from a document structure graph, for each rule, in accordance with the rule. At this time, the knowledge addition unit 10 extracts from the document structure graph any subgraph that matches the rule, assuming that the portions corresponding to "XXX" and "YYY" in the rule are arbitrary text. The present embodiment is similar to the first embodiment in this regard as well. It should be noted that the text corresponding to XXX and the text corresponding to YYY are contained in the nodes at both ends of the subgraph extracted in accordance with the rule.

Therefore, in the third embodiment, there is a case where the subgraph extracted by the knowledge addition unit 10 in accordance with the rule includes the text corresponding to XXX or the text corresponding to YYY having a dependency relationship. For example, the subgraph as exemplified in FIG. 21(b) may be extracted by the knowledge addition unit 10 in accordance with the rule.

The knowledge addition unit 10 extracts nouns from the text corresponding to XXX and the text corresponding to YYY in the subgraph extracted in accordance with the rule. At this time, in the case where the text corresponding to XXX and the text corresponding to YYY include particle phrases, the knowledge addition unit 10 extracts nouns not included in such particle phrases from the text. The knowledge addition unit 10 then extracts knowledge that the noun extracted from the text corresponding to YYY and the text corresponding to XXX have a relationship, as new knowledge, and adds the new knowledge to the inter-word relationship information. For example, in the case where the given inter-word relationship information indicates the is-a relationship between words, the knowledge addition unit 10 may extract, as new knowledge, the knowledge that the noun extracted from the text corresponding to YYY and the noun extracted from the text corresponding to XXX have the is-a relationship. At this time, the knowledge addition unit 10 determines that the noun extracted from the text corresponding to YYY is at an upper level in the is-a relationship and the noun extracted from the text corresponding to XXX is at a lower level in the is-a relationship.

A more specific description will be given below with reference to FIG. 21(b). It is here assumed that the given inter-word relationship information is the inter-word relationship information shown in FIG. 4. Suppose that the knowledge addition unit 10 has extracted the subgraph illustrated in FIG. 21(b) in accordance with the rule. In this case, the text corresponding to XXX in the rule is "Takeoka", and the text corresponding to YYY is the sentence "The researchers of this project are as follows." The knowledge addition unit 10 extracts the noun "Takeoka" from the text "Takeoka" corresponding to XXX. The knowledge addition unit 10 also extracts nouns from the text "The researchers of this project are as follows." corresponding to YYY. There are two nouns ("researchers", "project") in the sentence "The researchers of this project are as follows." However, the "project" is a noun included in the particle phrase "of this project". The knowledge addition unit 10 thus extracts the noun "researchers" not included in the particle phrase. In the case where the extracted noun is in the plural form, the knowledge addition unit 10 may correct it to the singular form. In the present example, it is assumed that the knowledge addition unit 10 extracts "researchers" and corrects it to the singular form "researcher".

Figure 31:
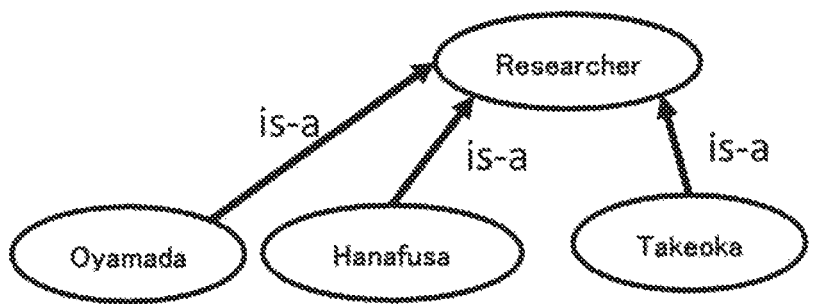
FIG. 31 is a schematic diagram showing an example of the inter-word relationship information after the new knowledge has been added thereto.

In this case, the knowledge addition unit 10 extracts new knowledge that the noun "researcher" extracted from the text corresponding to YYY and the noun "Takeoka" extracted from the text corresponding to XXX have the is-a relationship and that the noun "researcher" extracted from the text corresponding to YYY is at the upper level and the noun "Takeoka" extracted from the text corresponding to XXX is at the lower level. This knowledge can be represented as shown in FIG. 14. The knowledge addition unit 10 adds this new knowledge to the given inter-word relationship information (see FIG. 4). This results in the inter-word relationship information as shown in FIG. 31.

According to the third embodiment, advantageous effects similar to those in the first embodiment are obtained. Further, in the third embodiment, the knowledge addition unit 10 extracts, from the subgraph extracted in accordance with the rule, nouns from the text corresponding to XXX and the text corresponding to YYY. The knowledge addition unit 10 then obtains new knowledge that the nouns have a relationship. It is therefore possible to prevent unnatural knowledge as illustrated in FIG. 21(c) from being derived as the new knowledge.

Figure 32:
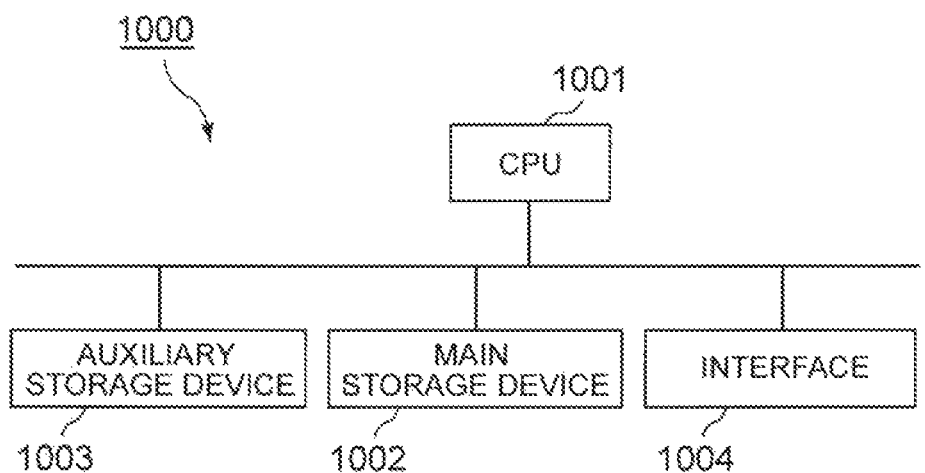
FIG. 32 is a schematic block diagram showing an exemplary configuration of a computer according to each embodiment of the present invention.

FIG. 32 is a schematic block diagram showing an exemplary configuration of a computer according to each embodiment of the present invention. The computer 1000 includes a CPU 1001, a main storage device 1002, an auxiliary storage device 1003, and an interface 1004.

The knowledge expansion system 1 of each embodiment of the present invention is implemented in the computer 1000. The operation of the knowledge expansion system 1 is stored in the form of a knowledge expansion program in the auxiliary storage device 1003. The CPU 1001 reads the knowledge expansion program from the auxiliary storage device 1003 and deploys it to the main storage device 1002 to perform the processing described in each of the above embodiments in accordance with the knowledge expansion program.

The auxiliary storage device 1003 is an example of a non-transitory tangible medium. Other examples of the non-transitory tangible medium include a magnetic disk, a magneto-optical disk, a compact disk read only memory (CD-ROM), a digital versatile disk read only memory (DVD-ROM), a semiconductor memory, etc. connected via the interface 1004. When this program is delivered to the computer 1000 via a communication line, the computer 1000 having received the delivery may deploy the program to the main storage device 1002 to perform the above processing.

The program may also be one that realizes some of the above processing. Further, the program may be a differential program that achieves the above processing in combination with another program already stored in the auxiliary storage device 1003.

Further, some or all of the components may be realized by a general-purpose or dedicated circuit (circuitry), a processor, etc., or a combination thereof. They may be configured by a single chip or by a plurality of chips connected via a bus. Some or all of the components may also be realized by a combination of the above-described circuitry, etc. and the program.

In the case where some or all of the components are realized by a plurality of information processing devices or circuits, the information processing devices or circuits may be arranged in a centralized manner or in a distributed manner. For example, the information processing devices or circuits may be realized in the form of client-and-server system, cloud computing system, or the like, where each device or circuit is connected via a communication network.

Figure 33:
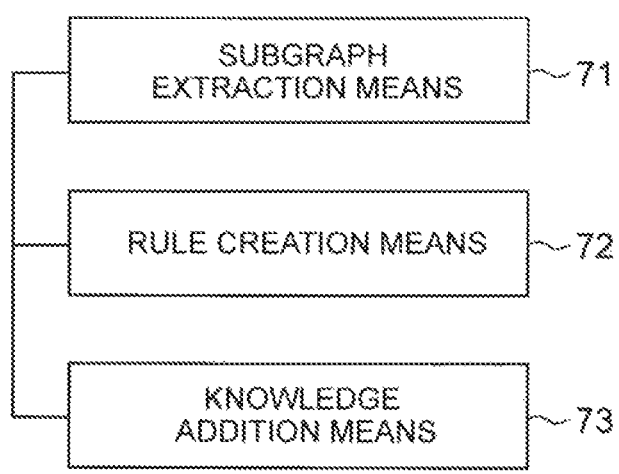
FIG. 33 is a block diagram showing an overview of the knowledge expansion system of the present invention.
Figure 34:
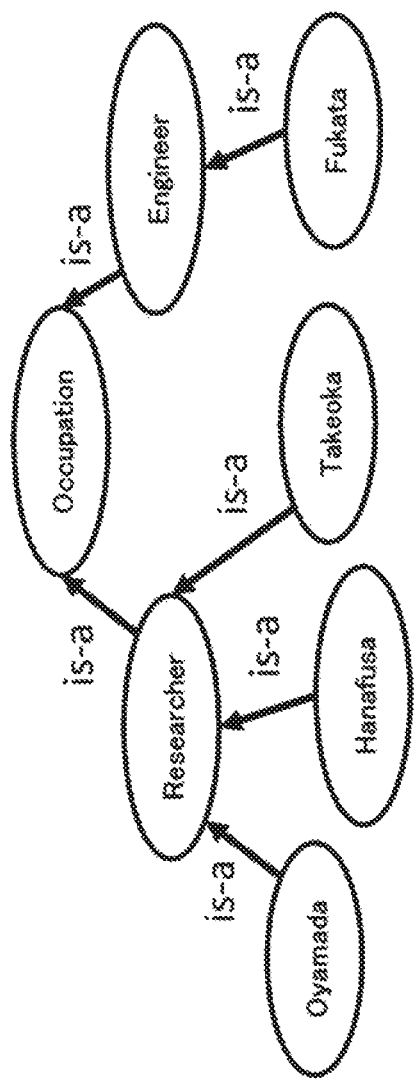
FIG. 34 is a schematic diagram showing an example of inter-word relationship information.
Figures 35, 36, 37, 38:
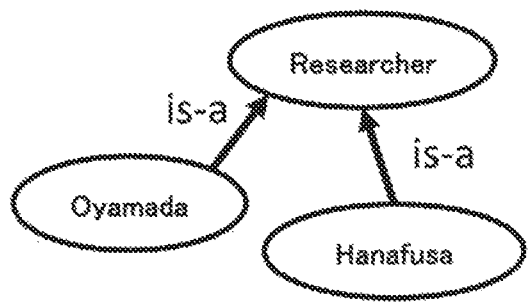
FIG. 35 is a schematic diagram showing an example of a given document in a general technique.
FIG. 36 is a schematic diagram showing an example of given inter-word relationship information in the general technique.
FIG. 37 is a schematic diagram showing examples of sentences extracted from a document in the general technique.
FIG. 38 is a schematic diagram showing examples of sentences extracted on the basis of a rule in the general technique.
Figure 39:
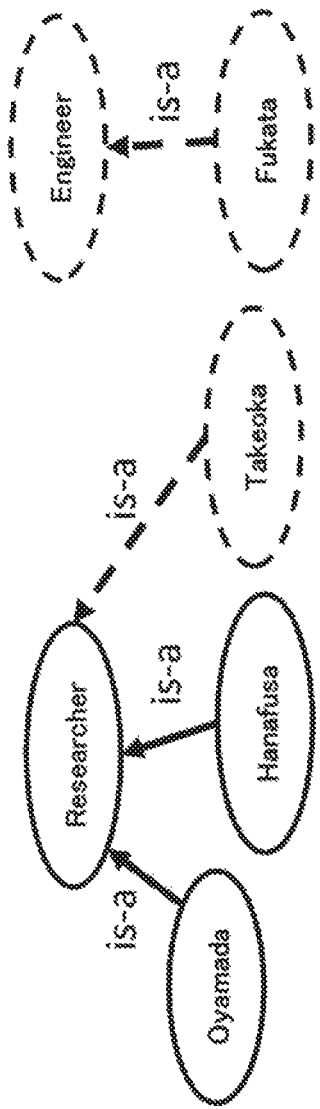
FIG. 39 is a schematic diagram showing an example of the inter-word relationship information with new knowledge added in the general technique.

An overview of the present invention will now be described. FIG. 33 is a block diagram showing an overview of the knowledge expansion system of the present invention. The knowledge expansion system of the present invention includes subgraph extraction means 71, rule creation means 72, and knowledge addition means 73.

The subgraph extraction means 71 (for example, the subgraph extraction unit 5) extracts, from a document structure graph indicating a document structure, a subgraph as a part of the document structure graph on the basis of inter-word relationship information indicating a relationship between a word and a word.

The rule creation means 72 (for example, the rule creation unit 8) creates a rule for extracting a subgraph having the same structure as the subgraph from the document structure graph.

The knowledge addition means 73 (for example, the knowledge addition unit 10) extracts a subgraph from the document structure graph in accordance with the rule and adds information indicated by the subgraph to the inter-word relationship information.

Such a configuration enables expansion of knowledge included in inter-word relationship information, on the basis of a document structure graph indicating a document structure and the inter-word relationship information.

Further, the system may be configured such that it includes subgraph counting means (for example, the subgraph counting unit 7) for counting the number of subgraphs extracted by the subgraph extraction means 71 for each subgraph structure, and selecting the subgraph structure for which the count result is not smaller than a threshold value, and the rule creation means 72 creates, on the basis of the subgraph of the selected structure, a rule for extracting a subgraph of that structure from the document structure graph.

Further, the system may be configured such that the document structure graph includes nodes each having node type information indicating a type of the node, the system includes preprocessing execution means (for example, the preprocessing execution unit 11) for executing preprocessing when a node in a given document structure graph contains text having a dependency relationship, the preprocessing including performing dependency analysis on the text to divide the node into a plurality of nodes and assigning to respective one of the plurality of nodes information indicating a type of an element of the text obtained by the dependency analysis as the node type information, and the subgraph extraction means 71 extracts, from the preprocessed document structure graph, a subgraph having at both ends a node in the document structure graph containing one of two words having a relationship in its text and a node in the document structure graph containing the other of the two words in its text, on the basis of the inter-word relationship information.

Further, the system may be configured such that the subgraph extraction means 71 extracts, from the document structure graph including nodes each having node type information indicating a type of the node, a subgraph having at both ends a node in the document structure graph containing one of two words having a relationship in its text and a node in the document structure graph containing the other of the two words in its text on the basis of the inter-word relationship information, and the knowledge addition means 73 extracts nouns in the text contained in the nodes at the both ends of the subgraph extracted from the document structure graph in accordance with the rule, and adds information that the nouns obtained from the both nodes have the relationship to the inter-word relationship information.

While the present invention has been described with reference to the embodiments, the present invention is not limited to the above embodiments. The configurations and details of the present invention can be subjected to various modifications appreciable by those skilled in the art within the scope of the present invention.

INDUSTRIAL APPLICABILITY

The present invention is suitably applicable to a knowledge expansion system that expands the knowledge included in the inter-word relationship information.

REFERENCE SIGNS LIST 1 knowledge expansion system
2 document structure graph storage unit
3 inter-word relationship information storage unit
4 data reading unit
5 subgraph extraction unit
6 subgraph storage unit
7 subgraph counting unit
8 rule creation unit
9 rule storage unit
10 knowledge addition unit
11 preprocessing execution unit

The invention claimed is:

1. A knowledge expansion system comprising:
a subgraph extraction unit that extracts from a document structure graph indicating a document structure a subgraph as a part of the document structure graph on the basis of inter-word relationship information indicating a relationship between a word and a word;
a rule creation unit that creates a rule for extracting a subgraph having a same structure as the subgraph from the document structure graph; and
a knowledge addition unit that extracts a subgraph from the document structure graph in accordance with the rule and adds information indicated by the subgraph to the inter-word relationship information.

2. The knowledge expansion system according to claim 1, comprising a subgraph counting unit that counts, for each subgraph structure, the number of subgraphs extracted by the subgraph extraction unit, and selects the subgraph structure for which the count result is not smaller than a threshold value, wherein
the rule creation unit, on the basis of the subgraph of the selected structure, creates a rule for extracting a subgraph having the structure from the document structure graph.

3. The knowledge expansion system according to claim 1, wherein
the document structure graph includes nodes each having node type information indicating a type of the node,
the knowledge expansion system comprises a preprocessing execution unit that executes preprocessing when a node in a given document structure graph contains text having a dependency relationship, the preprocessing including performing dependency analysis on the text to divide the node into a plurality of nodes and assigning to respective one of the plurality of nodes information indicating a type of an element of the text obtained by the dependency analysis as the node type information, and
the subgraph extraction unit extracts, from the preprocessed document structure graph, a subgraph having at both ends a node in the document structure graph containing one of two words having a relationship in its text and a node in the document structure graph containing the other of the two words in its text on the basis of the inter-word relationship information.

4. The knowledge expansion system according to claim 1, wherein the subgraph extraction unit extracts, from the document structure graph including nodes each having node type information indicating a type of the node, a subgraph having at both ends a node in the document structure graph containing one of two words having a relationship in its text and a node in the document structure graph containing the other of the two words in its text on the basis of the inter-word relationship information, and the knowledge addition unit extracts nouns in the text contained in the nodes at the both ends of the subgraph extracted from the document structure graph in accordance with the rule, and adds information that the nouns obtained from the both nodes have the relationship to the inter-word relationship information.

5. A knowledge expansion method comprising:

extracting from a document structure graph indicating a document structure a subgraph as a part of the document structure graph on the basis of inter-word relationship information indicating a relationship between a word and a word;

creating a rule for extracting a subgraph having a same structure as the subgraph from the document structure graph; and extracting a subgraph from the document structure graph in accordance with the rule and adding information indicated by the subgraph to the inter-word relationship information.

6. A non-transitory computer-readable recording medium in which a knowledge expansion program is recorded, the knowledge expansion program causing a computer to perform:

subgraph extraction processing of extracting from a document structure graph indicating a document structure a subgraph as a part of the document structure graph on the basis of inter-word relationship information indicating a relationship between a word and a word;

rule creation processing of creating a rule for extracting a subgraph having a same structure as the subgraph from the document structure graph; and knowledge addition processing of extracting a subgraph from the document structure graph in accordance with the rule and adding information indicated by the subgraph to the inter-word relationship information.

* * * * *